US012494132B2

(12) United States Patent
Rose et al.

(10) Patent No.: US 12,494,132 B2
(45) Date of Patent: Dec. 9, 2025

(54) SYSTEM FOR MANAGING FLIGHT CONTROLS FROM A GROUND STATION FOR AN UNCREWED AIRCRAFT

(71) Applicant: Reliable Robotics Corporation, Mountain View, CA (US)

(72) Inventors: Robert Rose, Mountain View, CA (US); Michael Westenhaver, Mountain View, CA (US); Ian Gulliver, Mountain View, CA (US)

(73) Assignee: RELIABLE ROBOTICS CORPORATION, Mountain View, CA (US)

( * ) Notice: Subject to any disclaimer, the term of this patent is extended or adjusted under 35 U.S.C. 154(b) by 91 days.

(21) Appl. No.: 18/444,653

(22) Filed: Feb. 17, 2024

(65) Prior Publication Data

US 2024/0282203 A1   Aug. 22, 2024

Related U.S. Application Data

(60) Provisional application No. 63/446,773, filed on Feb. 17, 2023.

(51) Int. Cl.
| | |
|---|---|
| G08G 5/32 | (2025.01) |
| G05D 1/221 | (2024.01) |
| G05D 1/46 | (2024.01) |
| G05D 1/652 | (2024.01) |
| G05D 1/654 | (2024.01) |
| H04L 9/40 | (2022.01) |

(52) U.S. Cl.
CPC ............ *G08G 5/32* (2025.01); *G05D 1/221* (2024.01); *G05D 1/46* (2024.01); *G05D 1/652* (2024.01); *G05D 1/654* (2024.01); *H04L 63/0435* (2013.01); *H04L 63/0807* (2013.01)

(58) Field of Classification Search
None
See application file for complete search history.

(56) References Cited

U.S. PATENT DOCUMENTS

2022/0189316 A1\*  6/2022  Paul .................... G05D 1/0022
2024/0048557 A1\*  2/2024  Min ....................... H04L 9/3234

OTHER PUBLICATIONS

International Search Report and Written Opinion issued May 23, 2024 in corresponding application No. PCT/US24/16323, filed Feb. 17, 2024.

(Continued)

*Primary Examiner* — Peter D Nolan
*Assistant Examiner* — Michael F Whalen
(74) *Attorney, Agent, or Firm* — Brownstein Hyatt Farber Schreck, LLP

(57) ABSTRACT

System and graphical user interface for managing communications between a remote terminal device operated by a remote pilot or other operator and an uncrewed aircraft. Specifically, the systems described herein can be used for secure and reliable generation and transmission of a flight path or route by a ground station located remote from an uncrewed aircraft. Using the generation and transmission schemes described herein, the flight path may be reliably transmitted from the ground station to the uncrewed aircraft and execution of operations corresponding to the generated flight path may be controlled by a ground-based pilot having a valid authentication data stored on a removable media.

20 Claims, 9 Drawing Sheets

(56) References Cited

OTHER PUBLICATIONS

International Preliminary Report on Patentability, issued Aug. 28, 2025 in corresponding application PCT/US2024/016323, filed Feb. 17, 2024.

* cited by examiner

SYSTEM FOR MANAGING FLIGHT CONTROLS FROM A GROUND STATION FOR AN UNCREWED AIRCRAFT

CROSS-REFERENCE TO RELATED APPLICATION

This application is a nonprovisional and claims the benefit under 35 U.S.C. § 119(e) of U.S. Provisional Patent Application No. 63/446,773, filed Feb. 17, 2023, and titled "SYSTEM FOR MANAGING FLIGHT CONTROLS FROM A GROUND STATION FOR AN UNCREWED AIRCRAFT," the contents of which are incorporated herein by reference as if fully disclosed herein

TECHNICAL FIELD

The present disclosure is generally directed to a system for operating uncrewed aircraft and, more specifically, systems and techniques for managing flight controls for an uncrewed aircraft from a remote ground station using a networked routing system.

BACKGROUND

Traditionally, aircraft are manually piloted by an onboard human who is able to directly operate aircraft controls and monitor flight conditions during flight. However, trained pilots are a limited resource and can be in high demand, which may limit the availability of air travel and air-based shipments. To help alleviate this inherent constraint, aircraft may be remotely piloted and/or rely on computer-based control. In order to provide robust and reliable operation, traditional communication and control systems may be inadequate for remote operation of an aircraft. The systems and techniques described herein may be used to provide remote operation of an aircraft in a way that is reliable under a wide range of use conditions and operational scenarios.

SUMMARY

Example embodiments described herein are directed to systems and techniques for remote operation of an aircraft. Specifically, the embodiments described herein can be used to remotely generate and implement flight plans to an uncrewed aircraft that is able to execute the flight plan with no or little human intervention.

Some example embodiments are directed to a computer-implemented method for operating an uncrewed aircraft using a ground station located remote from the uncrewed aircraft. The ground station is located remote from the uncrewed aircraft and generates a first flight plan using a first flight management system and a second flight plan on a second flight management system. The second flight plan is based on the first flight plan and may be generated contemporaneously with the first flight plan. The ground station may also generate a route using the first flight plan stored on the first flight management system or the second flight plan stored on the second flight management system, and one or more constraints accessed using one or more geographic locations of the first and second flight plans. At the ground station, a set of data packets may be generated using the generated route. A first encryption key may be extracted or obtained from a removable physical media coupled to the ground station. Each data packet of the set of data packets may be encoded (e.g., encrypted) using the first encryption key to produce a set of encrypted data packets. The set of encrypted data packets may be transmitted to a first router element operably coupled to a first satellite subsystem. The set of encrypted data packets may also be transmitted to a second router element operably coupled to a second satellite subsystem. Each of the first router element and the second router element may be configured to verify each of the set of encrypted data packets by evaluating a sender key identifier created using the first encryption key with respect to a registered token stored in a global registry. In response to a successful verification, the router elements may relay each respective encrypted data packet to the uncrewed aircraft using a respective one of the first or second satellite subsystems. Subsequent to the set of encrypted data packets being transmitted to the uncrewed aircraft and prior to execution of flight operations based on the set of encrypted data packets, a user input may be received at the ground station including an execution command. In response to the first encryption key corresponding to a registration entry stored in the global registry, the execution of the flight operations based on the set of encrypted data packets may be executed on the uncrewed aircraft. In some embodiments, the flight operations include automated aircraft takeoff operations, automated flight, and automated landing operations executed without intervention by a human operator. In some embodiments, the first encryption key is stored in a digital certificate of a public key infrastructure scheme, and the digital certificate is associated with a licensed pilot authorized to operate the ground station.

In some cases, subsequent to transmitting the set of encrypted data packets to the uncrewed aircraft, an aircraft computing system onboard the uncrewed aircraft is configured to determine a second route based on the set of encrypted data packets and validate the second route with respect to a terrain database.

In some embodiments, the set of encrypted data packets are transmitted to the first router element via a first internet service provider interface and are also transmitted to the second router element via a second internet service provider interface distinct from the first internet service provider interface. In response to detecting a fault in the first internet service provider interface, the system may cause the set of encrypted data packets to be transmitted to the first router element via the second internet service provider interface. The first internet service provider interface may be provided via a wired communication channel, and the second internet service provider interface may be provided via a wireless communication channel. In response to a successful verification of the respective encrypted data packet, the first and second router elements may be configured to append a router signature to the respective encrypted data packet before causing transmission of the respective data packet to the uncrewed aircraft via the respective one of the first or second satellite subsystems. In response to an unsuccessful verification of the respective encrypted data packet, the first and second router elements may be configured to block transmission of the respective encrypted data packet.

In some example embodiments, the ground station is a first ground station, the set of encrypted data packets is a first set of encrypted data packets and the first router element is configured to receive a second set of encrypted data packets from a second ground station. In response to detection of a fault in the first router element, the first set of encrypted data packets and the second set of encrypted data packets are transmitted to the second router element.

Some example embodiments are directed to a ground station for remotely operating an uncrewed aircraft. The ground station may include a first flight management system configured to store a first flight plan, a second flight management system configured to store a second flight plan that mirrors the first flight plan, a display, and a flight planning and display controller operably coupled to the display, the first flight management system, and the second flight management system. The flight planning and display controller may include a processing unit and computer readable memory storing instructions that, when executed by the processing unit, cause the flight planning and display controller to: generate a route using the first flight plan stored on the first flight management system or the second flight plan stored on the second flight management system, and one or more constraints; generate a set of data packets using the generated route; extract a first encryption key obtained from a removable physical media coupled to the ground station; encode each data packet of the set of data packets using the first encryption key to produce a set of encrypted data packets; transmit the set of encrypted data packets to a first router element; and transmit the set of encrypted data packets to a second router element. Each of the first router element and the second router element may be configured to verify each of the set of encrypted data packets by evaluating a signature created using the first encryption key with an entry stored in a global registry and, in response to a successful verification, relay each respective encrypted data packet to the uncrewed aircraft using a respective satellite subsystem. The flight planning and display controller may also include instructions that, when executed by the processing unit, cause the flight planning and display controller to: receive an execution command at the ground station; and in response to the first encryption key corresponding to the entry stored in the global registry, cause the execution of flight operations based on the set of encrypted data packets on the uncrewed aircraft.

In some embodiments, the removable media is a smart card having a memory, the first encryption key is stored in the memory of the smart card, and the smart card is inserted into a port of the ground station. The first encryption key may be stored in a digital certificate of a public key infrastructure scheme, and the digital certificate may be issued to a licensed pilot authorized to operate the ground station.

Figure 1:
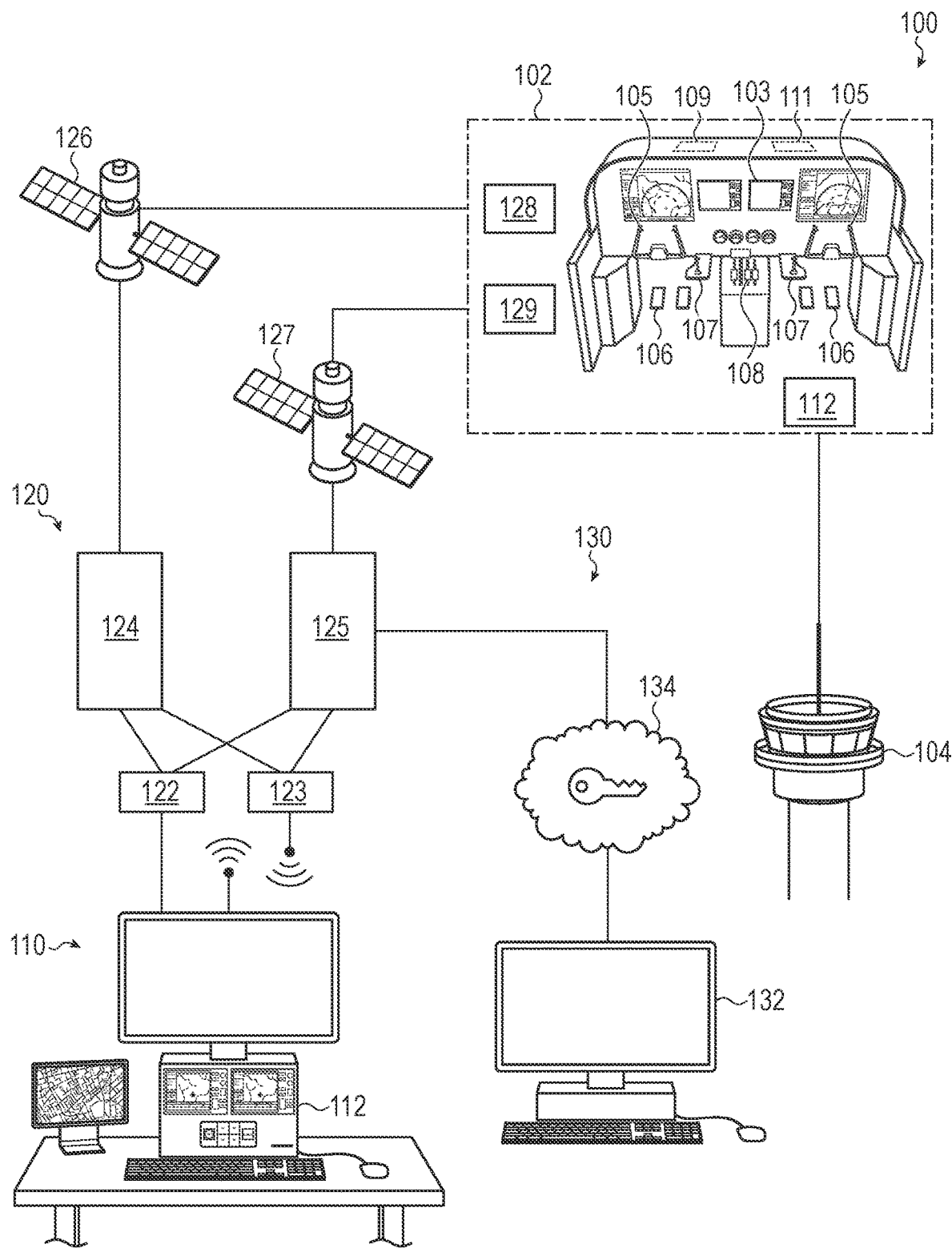
FIG. 1 depicts an example system for communicating with an uncrewed aircraft from a ground station.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is generally directed to systems and methods for managing communications and controls for an uncrewed aircraft. Specifically, the examples and techniques described herein can be used to provide robust and reliable communications between a ground station and an uncrewed aircraft. Specifically, the systems and techniques described herein can be used to avoid interruptions in service between the ground station and the uncrewed aircraft and provide single fault reliability for various components of the system. While some of the examples described herein are directed to particular communication systems and communication configurations, the proposed systems and methods are not limited to the specific examples described herein.

Remote operation and communication with an uncrewed aircraft may be performed using a network that includes various communication elements including a wireless link that may include a satellite-based or radio-frequency based system that is able to conduct two-way communication with an uncrewed aircraft during flight. While some examples provided herein are directed to a system that includes a satellite communication system, the same or similar techniques may be used for other non-satellite systems. For example, the systems and techniques described herein may be applied to communication systems that use ground-based communication systems including internet-enabled telephone systems or other networked computer systems. Generally, the techniques described herein can be applied to a variety of remote communication systems that include both or either satellite- or non-satellite-based communication systems.

Remote operation and communication with an uncrewed aircraft may be performed, at least in part, over a publicly accessible network like the Internet. Using a publicly available network allows for increased flexibility in ground station location and setup as compared to dedicated or proprietary network systems. However, when using publicly available or shared network components to conduct flight operations of an uncrewed aircraft, specially designed system architectures and secure communication schemes may help to increase the reliability and security of the system. Aspects of the present disclosure are directed to system architectures that may improve such operations by using redundant network elements and pilot authentication schemes specially adapted for use for conducting flight operations.

The following examples and embodiments are described with respect to a system for remote communication and operation of an uncrewed aircraft. However, similar systems and techniques may be used to perform remote communication and operation of other types of vessels including watercraft or land-based vehicles. For example, the following systems and techniques may be used to conduct remote operation and communication with watercraft and a station or facility associated with a harbor, channel, bay, or other body of water. The following systems and techniques may also be applied to land-based vehicles and a ground-based station or facility as part of a firefighting operation, construction project, or other ground-based operations.

These and other aspects of the system are described below with respect to the example embodiments depicted in FIGS. 1-9.

FIG. 1 depicts an example system with an uncrewed aircraft and a ground station operated by a remote pilot or other operator. Specifically, FIG. 1 depicts a system 100 that includes an uncrewed aircraft 102 that may be remotely piloted or remotely monitored or controlled by a ground station 110. The ground station 110 may also be referred to as a terminal device, remote terminal, remote control station, ground-based controller, ground-based facility, or simply a controller. Communications between the ground station 110 and the uncrewed aircraft 102 may be conducted using a communication network 120 having various network elements, described herein. The communications may also be conducted in conjunction with a security system 130, which may be partially or wholly integrated with the communication network 120. The system 100 may also include additional elements including an air traffic control (ATC) facility 104, other ground-based systems, and other aircraft (crewed and uncrewed). The uncrewed aircraft 102 may communicate with the ATC facility 104 using a radio-frequency (RF) communication module 112, which may include an RF transceiver and other communications electronics configured for wireless communications with an ATC facility 104, other aircraft, or other external devices.

As described herein, the communication network 120 and the described operation of the communication network 120 may provide several advantages including the ability to operate the uncrewed aircraft 102 over a potentially large geographical area and utilize network elements that are accessible from a variety of locations. As shown in FIG. 1, the communication network 120 includes internet-service provider interfaces 122, 123, which are operably coupled to or integrated with the ground station 110. The communication network 120 also includes one or more communication routing elements 124, 125, which may include systems and hardware that are accessible over a public network like the Internet. The communication network 120 also includes one or more satellite sub-systems 126, 127, which are adapted to relay communications from ground-based elements to one or more communication interfaces 128, 129 onboard the uncrewed aircraft 102.

The communication network 120 may leverage existing network hardware elements and also enable the ground station 110 to be operated from a variety of locations and in a variety of conditions. The communication network 120 may also provide more consistent and reliable communication links that are relatively unaffected by geographic topology, weather, and other factors that may interfere with some traditional communication schemes. The communication network 120 alone or in combination with the security system 130 may provide reliability that meets or exceeds regulatory requirements specified by the Federal Aviation Administration (FAA) or other regulatory authority. The described systems and techniques may also help to ensure the safe and robust operation of the uncrewed aircraft 102 even while the operation of individual network elements may falter or become unreliable.

Described in more detail below with respect to FIG. 8, the security system 130 may include a cloud-based registry 134, which may be used to maintain a list of authenticated users (authorized pilots) and registered components (e.g., ground stations and uncrewed aircraft), which may be referenced by the routing elements 124, 125 during operations. The security system 130 may be maintained and/or adapted by a security administrator 132. The security administrator 132 may be a separate device or, in some implementations, be integrated with the ground station 110.

As described herein, the uncrewed aircraft 102 may be an airplane, rotorcraft, powered lift, glider, lighter than air craft, or other current or future category of aircraft. The uncrewed aircraft 102 may be adapted for cargo or non-passenger service or, alternatively, may be adapted to carry one or more human passengers or both human and cargo service. While the following examples are directed to an uncrewed aircraft that is both able to be remotely operated and also adapted for manual flight by a human pilot, the same or similar techniques may be applied to other types of aircraft including without limitation, remote-controlled aircraft systems or drones that do not have a remote pilot or operator. All of these example aircrafts may be generally referred to as uncrewed/unmanned aerial vehicles (UAVs). The aircraft 102 may be configured for (or may be modified or retrofitted to enable) fully autonomous, semi-autonomous, and/or manually-operated flight modes, and may be configured for uncrewed flight, remotely operated or monitored flight, or crewed flight. The system used to operate the UAV includes, for example, remote pilot stations, ground systems, and the UAV itself may be generally referred to as an uncrewed/unmanned aircraft system (UAS).

In the present example, the aircraft 102 is a fixed-wing powered airplane, though this is merely for explanation, and the concepts described herein may be applied to other types of aircraft, as described above. The aircraft 102 is equipped with a flight controller 109 and controls that are configured to operate the propulsion system and various flight control surfaces of the aircraft 102 such as ailerons, an elevator, a rudder, flaps, spoilers, slats, and air brakes. The flight controller 109 may also be configured to control the aircraft propulsion system including, without limitation, piston propeller engines, turboprop engines, turbojet engines, turbofan engines, or ramjet engines. The flight controller 109 may also be adapted to control ground or land-based operations including taxiing, parking, and other pre-flight and post-flight maneuvers as well as operate various subsystems including, for example, an auxiliary power unit, cabin environmental controls, fuel system controls, anti-icing equipment, and security systems. The flight controller 109 may receive or otherwise access validated flight plans, and operate the onboard systems (e.g., propulsion, flight control surfaces, landing gear, flaps, air brakes, wheel brakes, etc.) to cause the aircraft 102 to traverse a validated flight plan.

The aircraft 102 may include flight controls that allow an onboard pilot to manually fly the aircraft. For example, the aircraft 102 may include a yoke 105 (or other control system, such as a control stick) that controls one or more flight control surfaces of the aircraft, rudder pedals 106, throttle controls 108, as well as other controls that facilitate manual control of the aircraft.

The flight controller 109 may control the various systems of the aircraft either through motorized or adapted versions of human operated controls, through dedicated control mechanisms, or a combination of the two. In some cases, the aircraft 102 is equipped with redundant electro-mechanical systems for each control operation and may include various other systems to ensure safe and reliable operation of the aircraft. The flight controller 109 may also be operably coupled to various sensors including, without limitation, airspeed sensors, temperature sensors, altimeters, global positioning system (GPS) sensors, accelerometers, tilt sensors, radar sensors, LiDAR sensors, radio navigation receivers, and cameras, which may provide feedback for closed-loop control operations for various aircraft functions and/or operations.

The flight controller 109 may be configured to control various systems of the aircraft 102 to cause the aircraft to traverse validated flight plans. In particular, the flight controller 109 may receive or access a validated flight plan (or instructions that correspond to a validated flight plan also referred to herein as a route), and operate the aircraft systems to fly the aircraft along the validated flight plan. For example, the flight controller 109 may receive a flight plan (or other information) that indicates a particular route to be flown. The flight controller 109 may determine how to control the aircraft 102 in order to traverse the route, including determining throttle settings, flight control surface manipulations, flap settings, landing gear settings, brake settings, and any other aircraft functions. Thus, the flight plan may indicate the path to be flown (and may define the target position of the aircraft along the route as a function of time), and the flight controller 109 may determine how to operate the aircraft 102 to execute the flight plan. In some cases, the flight controller 109 may operate the aircraft 102 in order to traverse the flight plan that is active in the flight management system 103 or otherwise provided to the flight controller 109 (e.g., via a flight plan generation system 111, or other components of an aircraft computing system more generally, such as the aircraft computing system 1230). The flight controller 109 may also execute ground-based operations, such as taxiing, takeoff, landing, etc. The flight controller 109 may be implemented by one or more computer systems. In some cases, the flight controller 109 may be a standalone computing system that interfaces with other computing systems on an aircraft (e.g., the FPGS 111, the flight management systems 103, etc.). In some cases, the flight controller 109 may be integrated with or instantiated by other computing systems of the aircraft, such as the aircraft computing system 530 of FIG. 5.

As described herein, the flight controller 109 may also operate the aircraft 102 in order to traverse modified flight plans, which may include traversing certain predefined maneuvers, such as a constant radius turn or a constant rate ascent/descent. In both cases, the flight controller 109 may control numerous aircraft systems to execute the maneuver, including responding to changing weather and wind conditions, accounting for turbulence, and the like. For example, because a validated flight plan or validated flight plan deviation may define the position of the aircraft with respect to time (rather than particular flight control surface manipulations), the flight controller 109 may be configured to control the aircraft's flight systems in order to traverse the validated flight plans. Thus, for example, in a constant radius turn, the flight controller 109 may adjust multiple aircraft systems to maintain the constant radius turn, including adjusting bank angle (e.g., to maintain a constant radius in changing wind conditions), adjusting a yaw rate, and the like.

Figure 5:
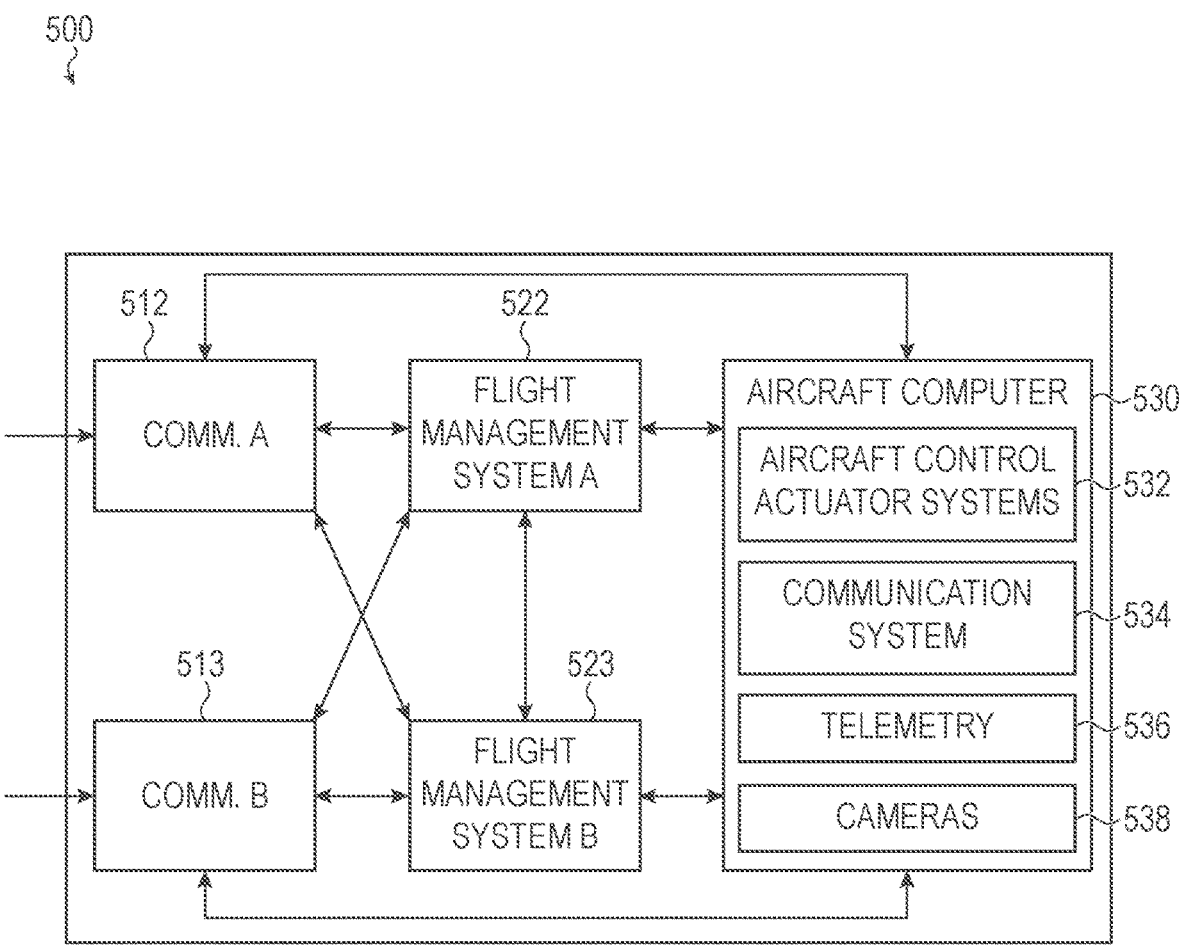
FIG. 5 depicts a schematic of an example on-board system of an uncrewed aircraft.

The aircraft 102 may also include a flight plan generation system (FPGS) 111. The FPGS 111 may manage and validate flight plans for the aircraft 102. The FPGS 111 may interface with the flight controller 109 and/or the flight management system 103 of the aircraft to provide validated flight plans and/or cause the aircraft 102 to traverse the validated flight plans. The FPGS 111 may also receive information from an auxiliary joystick control 107 and interpret the information as a proposal to modify a flight plan in a certain way. The FPGS 111 may validate the modified flight plans and cause the aircraft 102 to execute the modified flight plans. The FPGS 111 may be replicated in a ground based FPGS, which may provide redundancy to the onboard FPGS 111. The FPGS 111 may be implemented by one or more computer systems. In some cases, the FPGS 111 may be a standalone computing system that interfaces with other computing systems on an aircraft (e.g., the flight controller 109, the flight management systems 103, etc.). In some cases, the FPGS 111 may be integrated with or instantiated by other computing systems of the aircraft, such as the aircraft computing system 530 (FIG. 5).

The aircraft 102 may also include an auxiliary joystick control 107 that receives user manipulations and, in response to the manipulations, provides signals to the FPGS 111 (or another FPGS or other computing system associated with the aircraft 102) that are indicative of proposed deviations from a primary flight plan. The auxiliary joystick control 107 may resemble a joystick or other manipulatable input member and may be movable between a neutral position (e.g., a centered position) and one or more deflected positions. The deflected positions may include deflections in various different directions and various different distances (e.g., fore/aft and left/right). As described herein, when a manipulation of the auxiliary joystick control 107 is detected, parameters of the manipulation (e.g., a manipulation direction and manipulation distance) may be mapped to predetermined flight maneuvers that deviate from a validated primary flight plan (or any other flight plan the aircraft is currently executing). For example, a manipulation in a left/right direction (also referred to herein as a lateral direction) may map to a flight maneuver that includes a turn away from the primary flight plan (where the direction of the turn and turn radius are defined by the direction and distance of the manipulation). As another example, a manipulation in a fore/aft direction may map to a flight maneuver that includes an ascent or descent relative to the primary flight plan (where climb direction and the rate of climb are defined by the direction and distance of the manipulation). The predetermined flight maneuvers that a given auxiliary joystick input may be mapped to may be used to compute modified flight plans that include the predetermined flight maneuvers.

The auxiliary joystick control 107 may also include systems that provide tactile feedback to a user. For example, the auxiliary joystick control 107 may produce tactile feedback at deflection positions that are associated with different flight plan parameters. For example, tactile feedback may be provided at several lateral positions to indicate a radius of a proposed turn (e.g., a first tactile output may be felt at a first deflection position, which results in a proposed turn having a one mile radius; a second tactile output may be felt at a second deflection position, which results in a proposed turn having a 0.5 mile radius; etc.), and at several fore/aft positions to indicate a climb rate of a proposed ascent/descent. The tactile feedback systems may include physical detents, a haptic actuator, a friction brake, or any other suitable tactile output system.

The auxiliary joystick control 107 may be operationally coupled to the FPGS 111, which may interpret the signals from the auxiliary joystick control 107 as proposals for modified flight plans (e.g., including the predetermined flight maneuver to which an input maps) and validate the proposed modified flight plans. If validated, the FPGS 111 causes the aircraft 102 to traverse the modified flight plan (e.g., by providing the modified flight plan to a flight management system 103 and/or the flight controller 109 of the aircraft).

The aircraft 102 may also include a flight management system 103. The flight management system 103 may be designed to receive full or partial validated flight plans (e.g., from the FPGS 111), and may provide the flight plans to the flight controller 109. The flight management system 103 may be a redundant version of the ground-based flight management systems, and may provide the same general functionality as the ground-based flight management systems. The flight management system 103 may also include input and output systems (e.g., a display, buttons, a touch screen, etc.) to allow an operator to view flight plans (e.g., validated and/or proposed flight plans), cause flight plans to be executed, and the like.

As described herein, the FPGS 111 may generate and validate a flight plan (either a primary or modified flight plan) and provide the validated flight plan to the flight management system 103. The flight management system 103 may maintain only a single flight plan as the active or current flight plan, and the flight controller 109 may execute that flight plan. Accordingly, when the FPGS 111 modifies the flight plan (e.g., in response to input from an auxiliary joystick control), the FPGS 111 provides the modified validated flight plan to the flight management system 103 and the flight controller 109, in real time, executes the modified flight plan.

In some cases, a primary flight plan may be received at the aircraft (e.g., at the flight management system 103, FPGS 111, or an aircraft computing system) from a ground station, as described herein. For example, a primary flight plan may be generated at a ground station, provided to a flight management system at the ground station, and sent to the aircraft via one or more communications channels as described herein. The primary flight plan may be received at an aircraft computing system onboard the aircraft or another computing system onboard the aircraft (e.g., a flight management system 103, FPGS 111, etc.), and may be loaded into a memory of the FPGS 111 on the aircraft. The aircraft may then autonomously traverse the primary flight plan, such as by providing the primary flight plan to the flight controller 109 or otherwise providing instructions to the flight controller 109 that allow it to autonomously operate the aircraft to traverse the primary flight plan.

The aircraft operation system 100 may include various computing systems and associated applications that facilitate autonomous flight operations. The aircraft operation system 100 may include computing systems such as the flight management controllers (both aircraft- and ground-based), flight plan generation systems (both aircraft- and ground-based), and/or other computing systems. In some cases, operations are shared among multiple computing systems. In some cases, the computing systems may include redundancies. For example, the flight management system 103 and the flight management systems 212, 213 (FIG. 2) at a ground station 110 may each be configured to perform the same operations, and may share data, results, operational states, or other information between them in order to provide the functions and/or operations of the flight management systems. Similarly, the FPGS 111 and a ground-based FPGS may each be configured to perform the same operations, and may share data, results, operational states, or other information between them in order to provide the functions and/or operations of the FPGS.

Returning to FIG. 1, the communication network 120 and the described operation of the communication network 120 may provide several advantages including the ability to operate the aircraft 102 over a potentially large geographical area and utilize network elements that are accessible from a variety of locations. As shown in FIG. 1, the communication network 120 includes internet-service provider interfaces 122, 123, which are operably coupled to or integrated with the ground station 110. The communication network 120 also includes one or more communication routing elements 124, 125, which may include systems and hardware that are accessible over a public network like the Internet. The communication network 120 also includes one or more satellite sub-systems 126, 127, which are adapted to relay communications from ground-based elements to one or more communication interfaces 128, 129 onboard the aircraft 102.

The communication network 120 may leverage existing network hardware elements and also enable the ground station 110 to be operated from a variety of locations and in a variety of conditions. The communication network 120 may also provide more consistent and reliable communication links that are relatively unaffected by geographic topology, weather, and other factors that may interfere with some traditional communication schemes. The communication network 120 alone or in combination with the security system 130 may provide reliability that meets or exceeds regulatory requirements specified by the Federal Aviation Administration (FAA) or other regulatory authority. The described systems and techniques may also help to ensure the safe and robust operation of the aircraft 102 even while the operation of individual network elements may falter or become unreliable.

Described in more detail below with respect to FIG. 8, the security system 130 may include a cloud-based registry 134, which may be used to maintain a list of authenticated users (authorized pilots) and registered components (e.g., ground stations and aircraft), which may be referenced by the routing elements 124, 125 during operations. The security system 130 may be maintained and/or adapted by a security administrator 132. The security administrator 132 may be a separate device or, in some implementations, be integrated with the ground station 110.

Each of the subsystems operated on board the uncrewed aircraft 102 may be relayed to the ground station 110 by the communication network 120. In the present example, the uncrewed aircraft 102 relays signals to the ground station 110 via satellite subsystems 126, 127 and network routing elements 124, 125 that may conduct communications using a digital or network communication scheme. Specifically, data may be transmitted from the uncrewed aircraft 102 to the satellite subsystems 126, 127 via an uplink channel, which may transmit uplink data packets. Similarly data may be received from the satellite subsystems 126, 127 via a downlink channel, which may transmit downlink data packets. The uplink channel and downlink channel may be operated by one or more interfaces 128, 129, which may include one or more on-board transceivers configured to conduct wireless communications with the satellite using an established procedure and frequency band. In some cases, the uplink channel and downlink channel are operated over a common or shared network layer, data link layer, and/or physical communication layer. The transceiver(s) of the interfaces 128, 129 may be adapted to conduct Ka-band communications (26-40 GHz), Ku-band communications (12-18 GHz), X-band communications (8-12 GHz), C-band communications (4-8 G Hz), S-band communications (2-4 GHz), L-band communications (1-2 GHz), or other established communication bands.

Similarly, other elements of the communication network 120 and the ground station 110 may conduct communications with the satellite subsystems 126, 127 through uplink and downlink channels, which may transmit data packets or other digital communications. Similar to the aircraft-side of the satellite communication scheme, the uplink channel and downlink channel may operate over a shared network layer, data link layer, and/or physical communication layer. Other elements of the communication network 120 including the routing elements 124, 125 may be coupled to the satellite subsystems 126, 127 via a satellite service provider that is operably coupled to the other elements of the communication network 120 over a computer network like the Internet. In some embodiments described herein, the routing elements 124, 125 may include some or part of the satellite subsystems 126, 127. For purposes of the current examples and explanation, the satellite subsystems 126, 127 may include a terrestrial transmission station, which may be operated by a third party.

The data communication packets of the communication system 120 may be generated in accordance with an established communications protocol. For example, the data communication packets may be generated in accordance with a Real-time Transport Protocol (RTP), which may include Real Time Communications (RTC) such as WebRTC protocols enabled through a web browser, Real-Time Messaging Protocols (RTMP), Real-Time Streaming Protocols (RTSP), and other similar protocols. Other protocols may include HTTP live streaming (HLS) protocols like Low Latency HLS or other similar streaming communication schemes. These and other protocols may also be broadly characterized as Voice Over Internet Protocol (VOIP) in which analog voice communications are converted to digital data objects and transported via an Internet Protocol (IP) communication system. While framed or packeted communication schemes may be used, it is not necessary to use either framed or IP communication schemes for the data communication packets of the communication network 120.

As described herein, the system 100 may utilize the same uplink/downlink communication channels for transmitting flight control information, sensor readings, images, video feeds, or perform other data exchanges between the ground station 110 and the uncrewed aircraft 102. In some cases, some or all of these data exchanges are performed on a separate communication channel that is routed through the communication network 120. If the uncrewed aircraft 102 is predicted to be in reliable communication using another wireless communication network, some or all of the above-referenced data exchanges or voice communications may be, at least temporarily, conducted through another non-satellite wireless communication network.

As described herein, the communication network 120 may utilize redundant system elements, which may be used in parallel data packet transmission operations as well as fail-over alternative paths when one or more network elements become inoperable or unreliable. Specifically, the proposed system includes redundant internet provider interfaces 122, 123, which may be operated by distinct or separate providers. In some cases, one of the interfaces 122 is provided via a wired communication channel and the other interface 123 is provided via a wireless channel (e.g., 4G and/or 5G wireless communications). Each of the interfaces 122, 123 may be operably coupled to each of the routing elements 124, 125 creating a redundant and alternative path for communication packets to and from the ground station 110. Similarly, each of the routing elements 124, 125 may be operably coupled to one or more satellite subsystems 126, 127. While two satellite subsystems 126, 127 are depicted in the system 100 of FIG. 1, the satellite subsystems 126, 127 may be integrated or shared, depending on the implementation.

Figure 2:
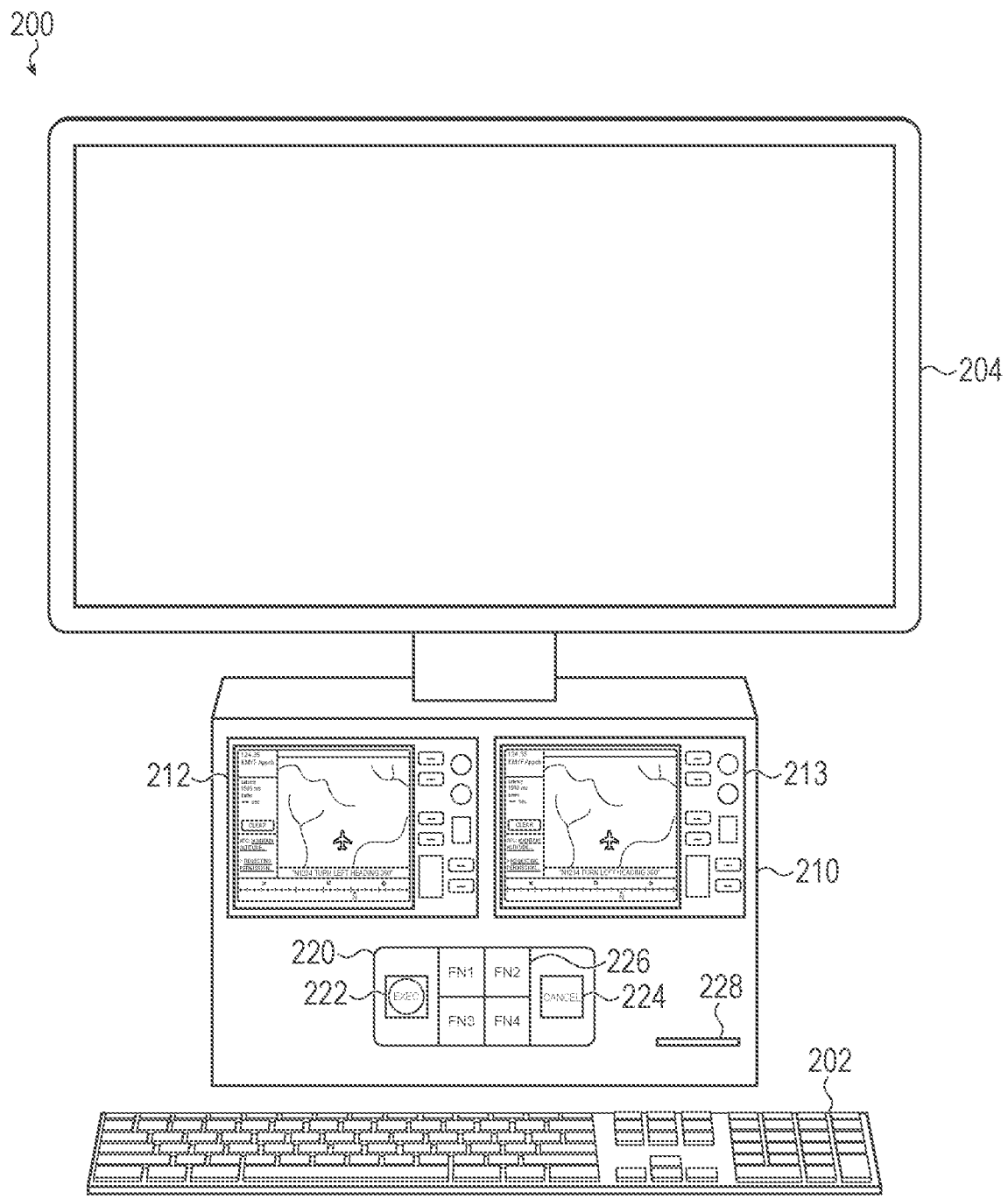
FIG. 2 depicts an example ground station for generating and communicating flight plans for an uncrewed aircraft.

FIG. 2 depicts an example ground station for generating and communicating flight plans for an uncrewed aircraft. Specifically, FIG. 2 depicts an example ground station 200 that may correspond to the ground station 110 of FIG. 1. An example operation of the ground station 110 of FIG. 1 is also described below with respect to FIG. 3. In general, the ground station 200 is configured to provide redundant flight management systems with an affirmative set of designated controls and a system for authenticating a remote pilot. The design of the ground station 200 provides important redundancy and confirmation that flight plans and other ground station instructions are accurate, authenticated, and intentionally executed.

As shown in FIG. 2, the ground station 200 includes two flight management systems 212, 213 which may be operated in tandem. In particular, instructions or input provided to one of the flight management systems 212, 213 may be replicated to the other system allowing for parallel and redundant operations. The flight management systems 212, 213 may be designed to receive full or partial flight path instructions, navigational controls, communication controls, and other flight or aircraft controls. The flight management systems 212, 213 are operably coupled to a flight planning and display controller (FPDC) (described below with respect to FIG. 3), which can be used to coordinate instructions, generate and validate flight instructions and coordinate operations with other elements of the system.

As shown in FIG. 2, the ground station 200 also includes an interface panel 220 that provides a set of designated control elements 222, 226, 224, which may be linked to specific system operations. In some cases the designated control elements 222, 226, 224 can be customized by the user and in some cases, the designated control elements 222, 226, 224 have a dedicated function that cannot be changed or configured by the user. In the present example, the designated control elements 222, 226, 224 are hardware buttons that operate electromechanical switches. However, in other implementations, some or all of the buttons may be implemented via a programmable interface like a touch-screen display or configurable touch panel. In the present example, the control element 222 is operable to confirm execution of flight controls or a programmed flight path, as described herein. Specifically, a user input to the control element 222 may cause the system to authenticate or validate the user by evaluating authentication on the removable media with respect to a registry. In response to a successful validation, the execute operation may be implemented, causing operations on an aircraft to be performed in accordance with a programmed or stored flight path. The control element 222 may be used to execute any number of a variety of different commands or operations implemented using the ground station 200. Commands or operations that are ready for execution may be referred to as being in a "armed" or "ready" state. In response to an unsuccessful validation, the execute operation may be suppressed and/or the user input to the control element 222 may be disregarded. Similarly, the control element 224 may be operable to cancel any "armed" or "ready" command or operation. With regard to the execution of a flight path, the control element 224 may be operable to cancel an armed or ready programmed flight route or flight path subsequent to a successful validation of the route. In this case, the current route and may be cleared from memory and the execution of the respective operations may be prevented or otherwise suppressed. A subsequent user input to the control element 222 may be disregarded or ignored. A similar result may occur for other commands or operations initiated at the ground station in response to a user input to the control element 224. Other operations may include commands to operate lights, environmental controls, or operate other subsystems of the aircraft. In some implementations, the control element 224 may be cause different operations to be performed depending on the state of the system. As described above, in one example, if a flight plan has been created by the ground station but not yet executed, the control element 224 may cause the flight plan to be cleared from the memory of the aircraft or purged from other portions of the data pipeline to disregard data packets being transmitted or cleared from memory in other portions of the system. If a flight plan has been created and also executed, at least in part, by the uncrewed aircraft, a default or alternate flight plan may be implemented if a default or alternate flight plan is predicted to be feasible or compatible with the canceled flight plan. If there is no default or alternate flight plan or is predicted to be incompatible with the current flight plan, no action may be taken in response to the user input to control element 224. The other control elements 226 may be configured to handle a variety of designated functions including, for example, abort operations, dedicated flight commands (e.g., land now or land soon), or other predefined operations (e.g., vector or abort).

The ground station 200 of FIG. 2 also includes a port 228 for receiving electronic credentials from an operator of the ground station 200 in the form of a removable media or device having authenticating information encoded or stored thereon. In some implementations, the port 228 is configured to receive a smart card, memory device, or other similar device having memory storing data that can be used to authenticate the user. By way of example, the port 228 may be configured to receive removable media having authentication data stored thereon and the ground station may electronically receive an authentication data (e.g., a token or certificate) that is associated with a user authorized to operate the ground station 200. Specifically, the ground station 200 is configured to receive the authentication data via an operable coupling between the removable media and the port 228. In some instances, the ground station 200 may be able to identify and authenticate a pilot that has been approved to create and execute flight instructions for an uncrewed aircraft. The authentication data may be in accordance with a Public Key Infrastructure (PKI) scheme and may include a digital certificate having a private key, which may be used to authenticate the user and/or encrypt data generated in response to user activity. For example, the private key may be used to digitally sign communications or instructions and/or used for encrypting data packets transmitted using the system described herein. The authenticating information encoded or stored on the removable media may be associated with a licensed pilot and used by the system to ensure that commands and flight paths sent for execution by the ground station are being performed by or under the supervision of a licensed pilot.

In some implementations, a user authorization must be performed before certain functions or user input to the ground station are enabled. For example, the removable media (including an certificate/encryption key) may need to be both operably coupled to the ground station (e.g., inserted into the port 228) and contain a public key or token having an associated registration entry stored in a registry before the system will execute certain operations or enable functions or user input. In the event that the certificate or encryption key does not have a associated registration entry in the registry, the ground station 200 may be configured to render certain user inputs or controls (e.g., control elements 222, 224, 226) inoperable by disregarding user input or selection of the respective controls.

The ground station 200 may also be used to monitor and control various aspects of the remote aircraft. As shown in FIG. 2, ground station 200 includes a monitor or display 204, which can be used to display proposed flight plans or aircraft commands for review and confirmation of the user. The display 204 may be operably coupled to an FPDC (described below with respect to FIG. 3) and used to perform various operations of the FPDC and other aspects of the system.

In some cases, the ground station 200 may display various navigational information including, without limitation, GPS location information, airspeed and heading information, radar information, or other data regarding a current status of the uncrewed aircraft, as detected by one or more on-board sensors or devices. In some cases, the ground station 200 may display a video feed or image displaying video or images captured by an on-board camera. The ground station 200 may also display a virtual instrumentation panel that simulates a portion of the instrumentation panel on the uncrewed aircraft, which may include distinct regions for each instrument including a graphical output that is varied in accordance with instrumentation or sensor readings obtained by the uncrewed aircraft. The instrumentation panel may be displayed using the display 204 or may be displayed using an auxiliary display or device.

The ground station 200 may also provide one or more controls for operating an on-board radio or controlling other communications between the uncrewed aircraft and another aircraft, air traffic control (ATC), or another entity. For example, using the virtual or hardware-based control elements, the remote pilot or other operator can select frequency bands and/or power levels used by the uncrewed aircraft for communication with ATC, select one or more predetermined radio settings for operating the audio hub of the uncrewed aircraft, reset the audio hub, or provide other remote commands, which are communicated through the communication system to the on-board computing system of the uncrewed aircraft. The ground station 200 may also include audio elements like a microphone and speaker used to facilitate the creation and monitoring of audio communications with the uncrewed aircraft or other entities.

As shown in FIG. 2, the ground station 200 may also include various input devices 202, which may include keyboards, mice, trackpads, tablets, joysticks, scroll wheels, and other input devices. Additionally, in some implementations, the ground station 200 may include multiple auxiliary displays or auxiliary devices, like tablets or notebook computers, which may be used to monitor or control other aspects of the system.

Figure 3:
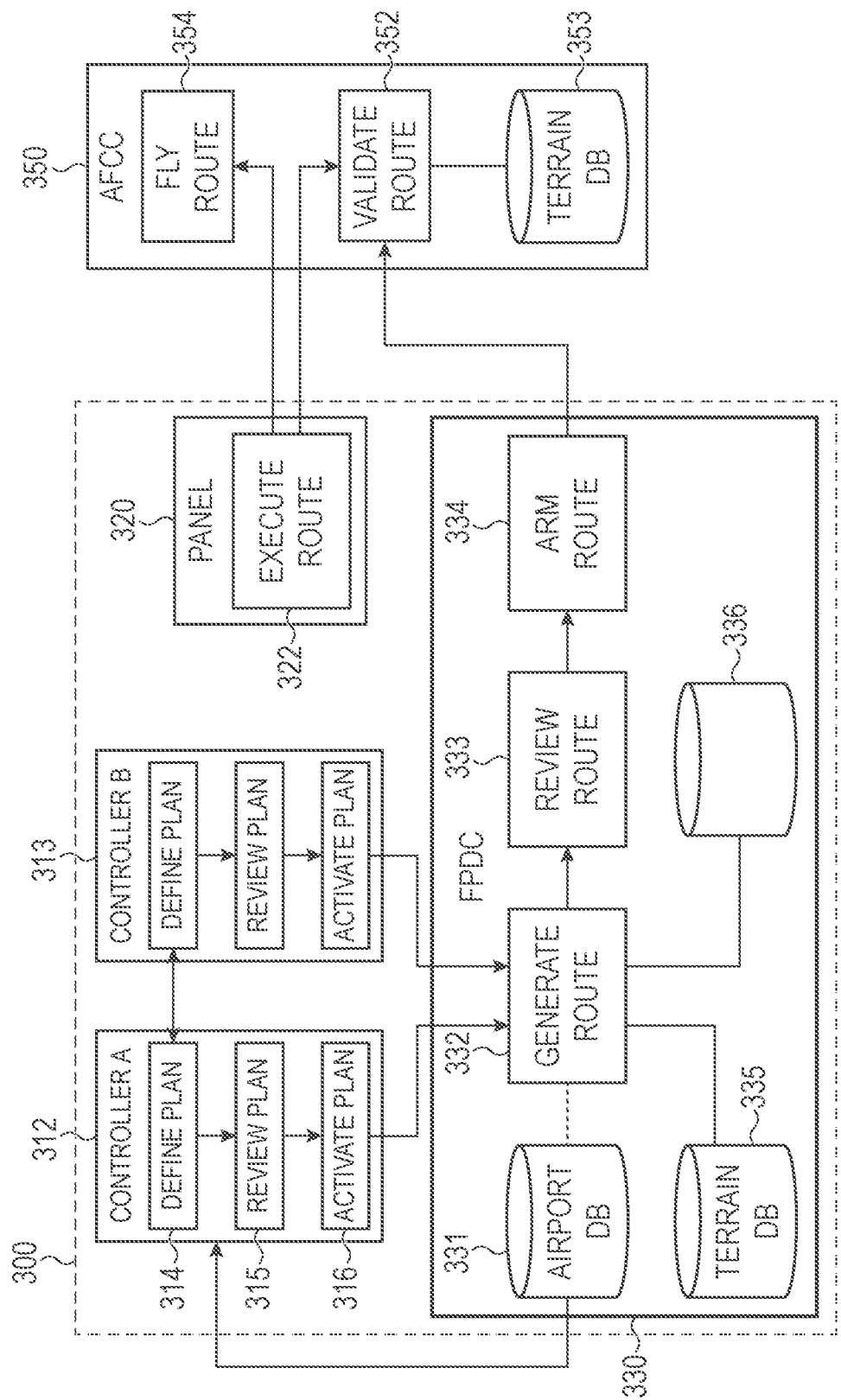
FIG. 3 depicts a schematic view and data flow of an example ground station.

FIG. 3 depicts a schematic view of an example ground station. The ground station 300 of FIG. 3 corresponds to the ground stations 200 of FIG. 2 and 110 of FIG. 1 and is configured to facilitate control and communications with an uncrewed aircraft. In general, the ground station 300 is a system that can provide accurate and validated flight instructions that are executed only with an affirmative or explicit action taken by an authenticated user using a dedicated control (e.g., the control element 222 of FIG. 2). The schematic view and operation of the ground station 300 is provided by way of example and use of the system may vary depending on the implementation and the scenario. For example, not all instructions require an affirmative or explicit confirmation and some commands or instructions performed using the ground station 300 do not require an authenticated user. Other variations on the following example operations may also be implemented using the ground station 300.

As shown in FIG. 3, the ground station 300 includes dual flight management systems 312, 313 which may be operated in tandem to improve the fault tolerance of the ground station 300. Specifically, the use of tandem flight management systems 312, 313 allows one of the flight management systems 312, 313 to be inoperable while providing continued operation of the overall system. For example, operations initiated on the first flight management system 312 may be replicated on the second flight management system 313 allowing for redundant computation and execution of the various flight management operations. In some implementations, the results of the parallel operations may be compared and any discrepancies or differences between the respective outputs may be resolved by the FPDC 330, flagged for the user, and/or disregarded by the FPDC. In one example implementation, if a fault is detected in either of the flight management systems 312, 313, the other operational flight management system 312 or 313 may be used to provide the flight path and other functionality to the ground station 300. The operations and outputs of either or both of the flight management systems 312, 313 may also be used to coordinate similar operations and outputs by a pair of tandem flight management systems positioned on the aircraft (e.g., items 422 and 423 of FIG. 4 and items 522 and 523 of FIG. 5). While only two flight management systems 312, 313 are depicted in the present example, other implementations may use more than two flight management systems. Similarly, more than one ground station may be used to control a single uncrewed aircraft with operations of the second ground station mirroring the operations of the ground station 300, which may provide additional hardware redundancy in the event of a fault or element failure.

In the present example, the dual flight management systems 312, 313 may be used to define a flight plan in operation 314. Operation 314 may include the definition of a complete flight plan that includes take off from a first ground location (e.g., initial airport), in-flight path and navigation sequences, and landing to a second ground location (e.g., destination airport). In defining the flight plan during operation 314, one or more databases including flight constraints may be referenced. For example, an airport database 331 may be referenced to obtain constraints and conditions associated with an origination or a destination airport. Other databases may include regional flight parameters, equipment capabilities and other constraints or rules that can be used when defining the flight plan. One or more of these databases may be copied into or reside on the flight management systems 312, 313. The complete flight plan may also include alternate paths or contingencies for varying flight conditions (e.g., weather changes, air traffic, fuel level) that may be monitored using sensors or other telemetry on-board the uncrewed aircraft.

The flight management systems 312, 313 may also be used to review the flight plan per operation 315 and activate the flight plan per operation 316. Operations 314, 315, and 316 may be mirrored on flight management system 313 and/or other flight management systems located on the aircraft or in other ground stations. Alternatively, a completed flight plan may be replicated or copied to other flight management systems after it has been defined. When executed by the uncrewed aircraft, the flight plan or route may define a series of flight operations including automated aircraft takeoff operations, automated flight, and automated landing operations that may be executed entirely autonomously. For example, a complete flight operation including takeoff, flight and landing may be performed by the uncrewed aircraft without intervention by a human operator or pilot.

In some implementations, the review of the flight plan 315 may include the generation of a flight plan summary or graphical output that corresponds to the defined route, which may be displayed on one or both of the flight management systems 312, 313. The flight management systems 312, 313 may also perform a first level of analysis of the defined flight plan to evaluated feasibility and/or compliance with air travel or aircraft-based constraints. Once the flight plan has been reviewed, the flight management systems 312, 313 may activate the plan automatically or in response to affirmative user input from the operator of the ground station 300.

As shown in FIG. 3, once a flight plan has been developed and activated using the flight management systems 312, 313, the flight plan may be transmitted to the FPDC 330 and used to generate a route at operation 332. Specifically, the FPDC 330 may generate the actual route by producing a series of route points or instructions for performing the defined flight plan. The route points may include three-dimensional coordinates, a trajectory vector, or other information that define control points for the aircraft at a respective location of the route. The route is defined using the flight plan and also referencing various databases 331, 335, 336, which may include additional constraints. The additional databases may include the airport database 331, as discussed above. The terrain database 335 may include geographic or terrain constraints, flight envelopes and other constraints. Other databases 336 may include aircraft capabilities, equipment limitations, environmental conditions (e.g., weather or wind conditions), and other constraints or factors. Generally, the databases 331, 335, 336 may be queried or referenced using one or more locations or other data elements extracted from the flight plan. For example, one or more locations extracted from or determined using the flight plan may be used to identify corresponding terrain constraints in the terrain database 335. Similarly, one or more locations determined using the flight plan may be used to determine airport related constraints from the airport database 331. Constraints may include flight envelopes, models of geometric features, or other three-dimensional constraints that may be used in generating the route.

The route may be computed using both flight plans stored on each flight management system 312, 313 and store flight constraints that are relevant to the flight plans. In one example, one or more geographic locations are extracted from the flight paths and are used to query one or more databases 331, 335, 336, or other data sources to extract a set of constraints and/or flight rules that are predicted to be related to the flight paths or the aircraft. The route may be generated or composed by applying the set of constraints and/or flight rules to the flight paths. Accordingly, the actual route may accommodate for flight constraints determined in response to data obtained from the airport database 331, flight envelopes or airspace predicted to be related to the flight paths, the specific aircraft which is to be executing the route, and other potential constraints. The FPDC 330 may also allow for visual review of the route in operation 333, in which a summary or representation of the generated route may be displayed on a display of the ground station 300. The FPDC 330 may also arm the route per operation 334 in response to a user input or completion of the review performed at operation 333. In some cases, the route may be a modified version of the flight plans and may include modified segments, limits, or other adaptations to ensure the route conforms to the respective constraints. In some cases, the route may include a number of data points and/or a data format that are adapted to the aircraft and/or the automatic flight controls of the aircraft. In some instances, the resolution of the route may be increased by interpolating points of the flight paths received from the flight management systems 312, 313. In other cases, the flight path data may be transformed from a first schema defined by the flight management systems 312, 313 to a second schema adapted for use with the automated aircraft and associated systems.

As shown in FIG. 3, the armed route may be transmitted to an aircraft computing system (ACS) 350, which may be located on the uncrewed aircraft. The route may be transmitted to the ACS 350 in accordance with the communication system described herein. The ACS 350 may perform a validation of the route in operation 354, which may perform the validation using data obtained from the terrain database 352 or other data source. This may confirm the route generated by the FPDC 330 and may serve as a final check of the route before execution. In one example, a volumetric envelope associated with the aircraft may be used to perform an interference analysis or other spatial analysis with respect to terrain data or other potential obstacles. In some cases, the database 352 or other data source includes or leverages environmental information about weather or other current flight conditions. In some implementations, the ACS 350 may validate the route using data collected from the onboard sensors or other telemetry. While the route validation 356 is shown as part of the ACS in FIG. 3, some or all of the route validation may be performed using the FPDC 330 or other system element.

Once validated, the ACS 350 may await an affirmative confirmation from an authenticated user (e.g., an authorized and authenticated pilot) operating the ground station 330. In some cases, the state of the system may be characterized or classified as "armed." As shown in FIG. 3, a confirmation of the flight validation at operation 354 may enable the operation of an execute control element (e.g., control element 222 of FIG. 2) at a control panel 320 of the ground station 330. The operation of the respective control element on the panel 320 may only be enabled in response to a successful authentication using a smart card or other authenticating device inserted in or operably coupled to the ground station 300. In response to an affirmative or explicit input provided to the control element of the panel 320 at operation 322, a corresponding signal may be transmitted to the ACS 350 via the communication system enabling the uncrewed aircraft to fly the route in accordance with operation 356. In some implementations, a user authorization must be performed before operation 322 is enabled. For example, a removable media including an encryption key may be both operably coupled to (e.g., inserted into) the ground station and contain an encryption key having a corresponding registration entry stored in a registry before the system will execute the execute route operation.

Figure 4:
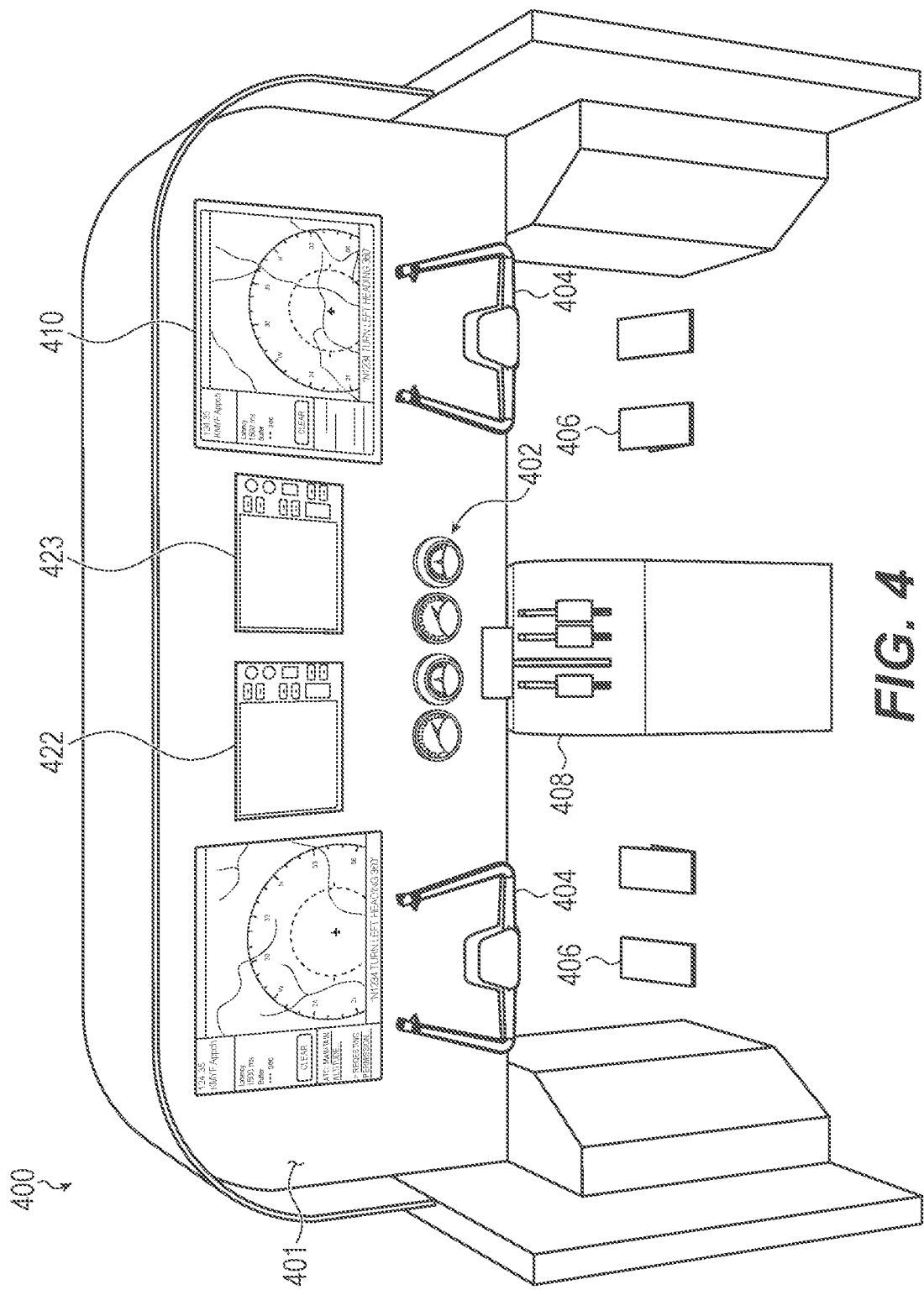
FIG. 4 depicts an example cockpit of an uncrewed aircraft.

The ACS 350 may include or be operably coupled to a pair of dual flight management systems similar to the flight management systems 312, 313 located in the ground station (see, e.g., flight management system 422, 423 of FIG. 4). The ACS 350 with the assistance of the onboard flight management systems and one or more control systems on the aircraft is adapted to cause the aircraft to fly the validated route per operation 356.

FIG. 4 depicts an example cockpit of an uncrewed aircraft. As shown in FIG. 4, the uncrewed aircraft 400 includes dual flight management systems 422, 423, which may be similar to the flight management systems 212, 213 and 312, 313 of FIGS. 2 and 3, respectively. The dual flight management systems 422, 423 may be similarly operated in tandem providing a level of redundancy and verification. The uncrewed aircraft 400 also includes an instrument panel 401 that includes instruments 402 and other interface elements including a display interface 410. The instruments 402 may include computers, displays, dials, navigation equipment, communications equipment, and the like. When operated in a piloted or partially automated mode, the instruments 402 may also receive inputs from one or more onboard pilots or crewmembers to control various systems of the aircraft. The cockpit may also include various manual input systems for receiving physical inputs from a pilot or crewmember to control one or more aircraft systems. For example, the cockpit may include one or more yokes 404 (or control sticks or other structures). The yokes 404 may control flight control surfaces such as ailerons, elevators, ruddervators, stabilators, or the like. The cockpit may also include one or more sets of rudder pedals 406, which may control a rudder of the aircraft (or a ruddervator or other flight control surface).

The cockpit of the aircraft 400 may also include a flight control input assembly 408. The flight control input assembly 408 is conventionally where control levers for the propulsion system of an aircraft (e.g., a throttle control and power condition lever(s)) are positioned, and as such is also referred to as a throttle quadrant. The flight control input assembly 408 may include control levers and other input members (e.g., dials, buttons, knobs, etc.) that are manually manipulated by an onboard pilot or crewmember to operate the control systems of the aircraft. The flight control input assembly 408 may include control levers for controlling propulsion systems of the aircraft, flight control surfaces (e.g., flaps, elevator trim, air brakes), landing gear, or other aircraft systems.

The aircraft may also include a radio communication system for conducting radio-based communications with an ATC station, other aircraft, or other entities operating an appropriate radio. In some cases, the on-board radio communication system includes voice communications that are relayed from the operator of the ground station. The radio communication system may be broadly described as a VHF channel that is shared between an ATC facility or other ground-based station and any aircraft that are within a specified region or geographic boundary. In some cases, the radio communication system may be adapted for universal communications (UNICOM) and may be operating at one of a number of predefined frequencies. Typically, UNICOM channels used by large airports in the U.S. operate on a 122.950 MHz frequency band. Other airports may have ATC that operate on 122.700 MHz, 122.725 MHz, 122.800 MHz, 122.975 MHz, 123.0-00 MHz, 123.050 MHz, 123.075 MHz, or other frequency band. The UNICOM channel frequency bands and operational parameters may also vary by country, region, or other factor. The ATC facility or station may operate one or more Voice Communication Control Systems (VCCS) that are able to manage channel coupling, ground telecom links, telephone patching, and other functionality.

As described herein, an aircraft may be part of an aircraft operation system in which communication is facilitated between the aircraft and ground-based systems. FIG. 5 depicts a schematic of an example onboard system of an aircraft. Portions of the onboard system may include or be referred to as an aircraft computing system and may be programmed or configured to operate in accordance with a set of instructions or settings. As shown in FIG. 5, the onboard system 500 includes a pair of communication modules 512, 513, which may include separate wireless transceivers that are configured to operate at frequencies used by the satellite subsystems, described above with respect to FIG. 1. The transceiver(s) of the communication modules 512, 513 may be adapted to conduct Ka-band communications (26-40 GHz), Ku-band communications (12-18 GHz), X-band communications (8-12 GHz), C-band communications (4-8 G Hz), S-band communications (2-4 GHz), L-band communications (1-2 GHz), or other established communication bands. In some cases, the two communication modules 512, 513 are configured to operate over different frequency ranges to provide signal diversity for the system 500.

As shown in FIG. 5, the system 500 also includes flight management systems 522, 523, which correspond to the flight management systems 422, 423 of FIG. 4 (or any other onboard flight management systems described herein). As discussed previously, the flight management systems 522, 523 may be operated in tandem to provide increased reliability and redundant verification of operations. As shown in FIG. 5, each of the flight management systems 522, 523 are operably coupled to each of the communication modules 512, 513. This crossover between communication modules 512, 513 may be used to provide redundant communications to each of the flight management systems 522, 523 or, alternatively, may be operated in a fail-over condition in which the communication modules 512, 513 are each operably coupled to a single flight management system 522, 523 until a reliability condition is detected, which may include a failure of service, a reduction in the quality of service, an error rate that exceeds a criteria, or other measure of a change in predicted reliability. Each of the flight management systems 522, 523 may be configured to receive and process flight plans or other flight commands generated by the ground station. For example, the flight management systems 522, 523 may receive, store, and display flight plans (such as validated flight plans from an FPGS) and may provide flight plan information to a flight controller or other system(s) of the aircraft to execute and/or traverse the flight plans.

As shown in FIG. 5, the system 500 also includes an onboard aircraft computing system 530. The aircraft computing system 530 may include and/or instantiate various computing and other systems that provide flight and other functions described herein. For example, the aircraft computing system 530 includes, instantiates, or is operably coupled to one or more subsystems including, without limitation, a flight controller 532 (e.g., corresponding to the flight controller 109 or any other flight controller described herein), a flight plan generation system 533 (e.g., corresponding to the FPGS 111 or any other FPGS described herein), a communication system 534, aircraft telemetry 536, and one or more onboard camera systems 1238. The communication system 534, telemetry 536, and cameras 538 may be used to provide the system and/or the operator of the ground station with current operating conditions and feedback for commands or controls of the aircraft.

The flight controller 532 is configured to automatically operate one or more of the control systems normally operated by an onboard pilot and may be configured to control various actuators and actuation systems used to modify control surfaces of the aircraft, propulsion systems, landing gear, and other aircraft subsystems, as defined and/or required by a validated flight plan. The flight controller 532 is configured to execute or implement various aircraft operations in accordance with a flight plan stored on or managed by the flight management systems 522, 523. For example, a validated route (computed using the techniques described herein) may be stored in the flight management systems 522, 523 as an aircraft-managed flight plan. Similar to the ground-based flight management systems, the aircraft-based flight management systems 522, 523 may be operated in tandem and may include mirrored flight plans to allow operation of the aircraft in the event one of the systems fails. The flight management systems 522, 523 may integrate various functions of the aircraft including instrumentation monitoring, input from the ground station, performance optimization, and other processes. Some of these processes may also be performed by the aircraft computing system 520. When a flight plan is executed, the one or both of the flight management systems 522, 523 may send instructions to the fight controller 532 of the aircraft computing system 530, which then controls various flight surfaces of the aircraft (e.g., ailerons, elevators, rudder) to maintain the instructed flight path, including an altitude, speed, and heading. As described previously, one notable aspect of the example uncrewed aircraft described herein is that many or all typical operations of the aircraft may be automatically controlled, without intervention from a human operator in a continuous or coordinated set of aircraft operations. For example, the uncrewed aircraft, described herein, may automatically taxi the aircraft on a taxiway to a runway, automatically take off, automatically operate the aircraft through the planned route and automatically land the aircraft at a destination, all without intervention from a pilot or other human operator.

Figure 6:
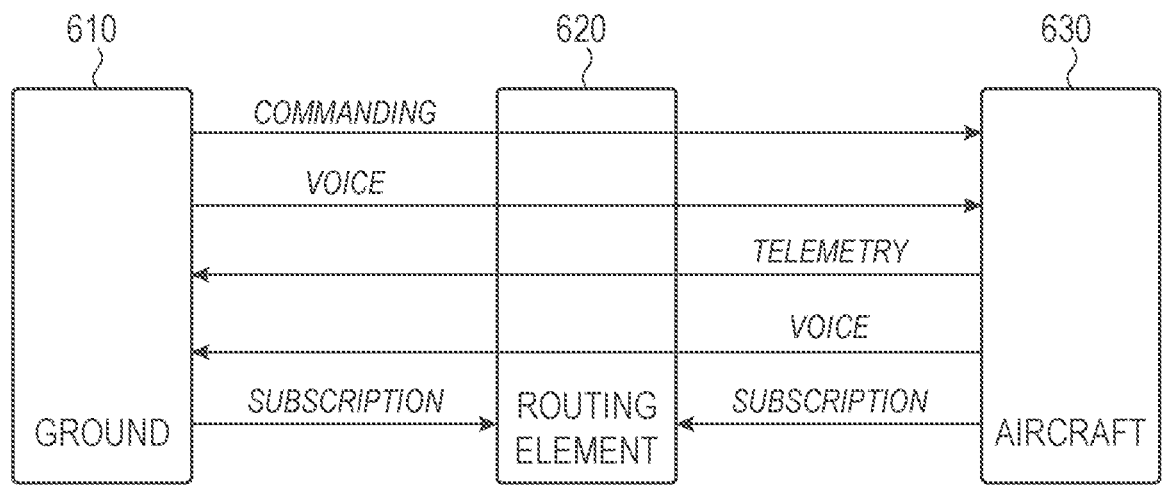
FIG. 6 depicts an example data flow between a ground station and an uncrewed aircraft.

FIG. 6 depicts an example data flow between the ground station and the uncrewed aircraft. The example system 600 is a simplified diagram indicating the subscription-based communication scheme implemented by the communication system of the present disclosure. Specifically, the example system 600 is a simplified example of the communication system 120 of FIG. 1 and may be used for conducting communication in accordance with the system 700 of FIG. 7. In the example system 600 of FIG. 6, each of the ground station 610 and the uncrewed aircraft 630 subscribe to messages handled and verified by the routing element 620. As shown in the system 600 of FIG. 6, command instructions, voice communication, sensors and other telemetry data are handled using a subscription scheme for directing data between the ground station 610 and the uncrewed aircraft 630.

In one example implementation, the routing element 620 publishes data packets to all devices having a current subscription. This allows for a flexible architecture that enables a ground station to monitor and control multiple aircraft and also allows for multiple ground stations to monitor and control the same aircraft using the same network elements. Additionally, the subscriptions may be configured to expire on a relatively short time interval, enabling the network configuration to be modified relatively easily while removing non-active network elements to reduce network traffic.

In one example, the ground station 610 or the aircraft 630 (the requesting component) transmit a subscription message request to one or more routing elements 620. In accordance with the requesting component having authenticated credentials that correspond to a cloud-based registry, the requesting component will receive designated messages (from a specified aircraft and/or ground station) for a predetermined period before the subscription expires. In such an implementation, there is no "unsubscribe" message type or need to expressly unsubscribe from a message or data packet set. In one example, the subscriptions expire a subscription period of 30 seconds or greater. In some cases, the subscriptions expire a subscription period of 60 seconds or greater. In some cases, the subscriptions expire a subscription period of 100 seconds or greater. In some cases, the subscriptions expire a subscription period of 300 seconds or greater. In some cases, the subscriptions expire a subscription period of 500 seconds or greater.

To avoid losing an active subscription, the requesting component may submit multiple redundant subscription requests, which may ensure that the subscription is maintained during active operations. In some cases, the requesting component may transmit a subscription request at 2x the expiration rate or greater. In some cases, the requesting component transmits a subscription request at 3x, 4x, 5x or greater of the expiration rate. For example, if a subscription is set to expire after 300 seconds, the requesting component may send a subscription request every 60 seconds in order to have a 5x request rate. In some cases, message transmissions by the respective component (ground station 610 or aircraft 630) are interpreted as a concurrent subscription request, which helps to reduce network traffic that would otherwise be generated simply to maintain the subscription. Having a sufficiently high request/transmission rate of, for example, every 60 seconds for a 300 second expiration, allows for some subscription message drops without losing continuous subscription service.

In some implementations, each of the ground station 610 and the aircraft 630 address the routers using statically-configured IP addresses. In some implementations, a domain name system (DNS) can be used to enable redirection of network traffic to alternative routing elements without requiring an update to all network components, individually. In some cases, the DNS registry is maintained on a cloud-based resource similar to the cloud-based registry used to authenticate users and system components.

In one example, a transmission from the ground station 610 includes a tuple or predefined data element that specifies an aircraft identifier and a communication direction flag. The routing element 620 may maintain a lookup table of subscribers accessible by the same tuple (e.g., {aircraft identifier, direction flag}). When the routing element 620 receives a message to be forwarded, the routing element 620 looks up all subscribers for the given tuple ({aircraft identifier, direction flag}) and sends a copy of the message to each subscriber. While this is provided by way of illustrative example, other subscription techniques and registry systems can be used, depending on the implementation.

Figure 7:
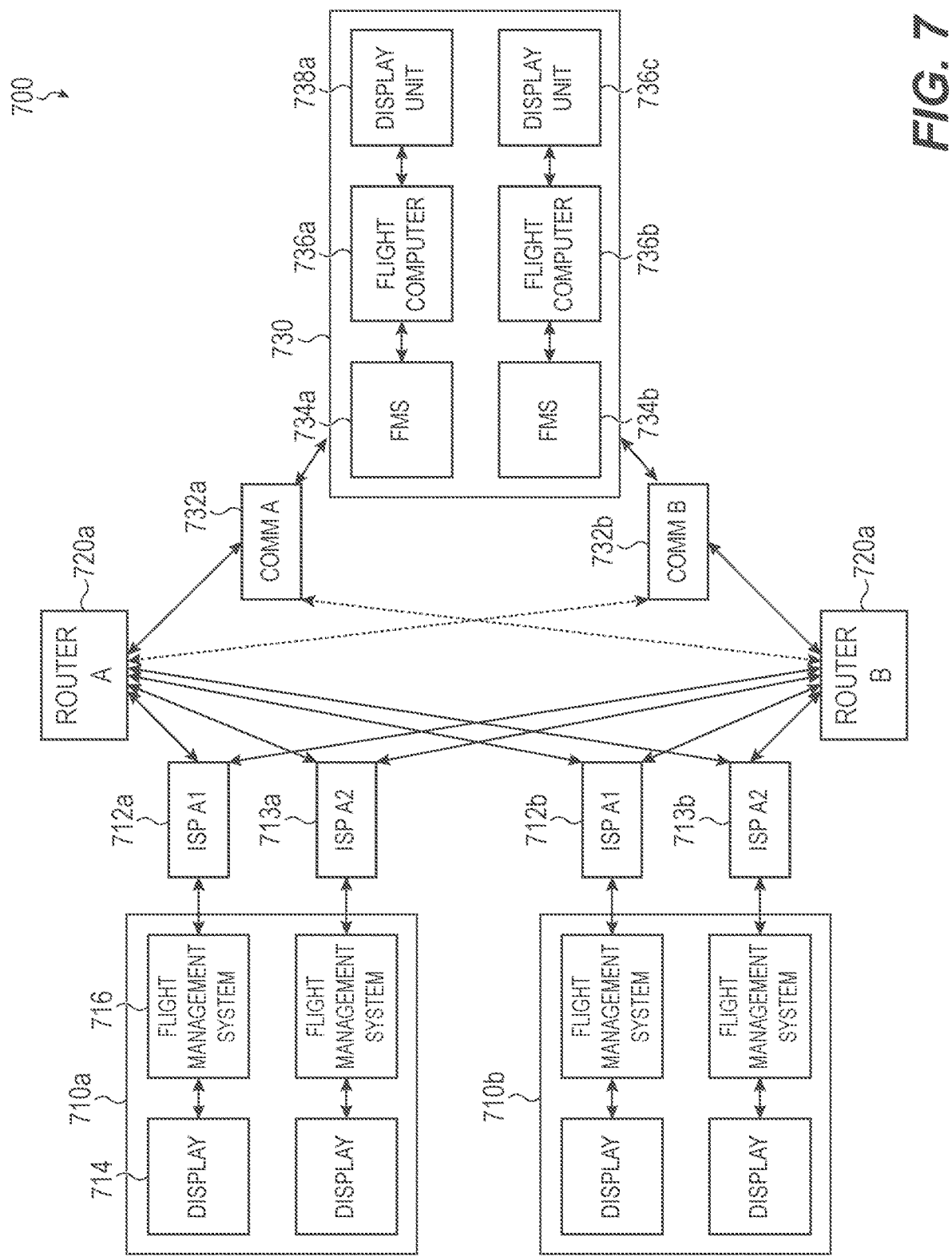
FIG. 7 depicts an example system for communicating with and controlling an uncrewed aircraft from a ground station.

FIG. 7 depicts an example system for communicating with and controlling an uncrewed aircraft from a ground station. Specifically, FIG. 7 depicts a system 700 that allows for uninterrupted communication between one or more ground stations 710a, 710b and an uncrewed aircraft 730. As described herein, the system 700 provides a robust system in which any one of a number of components can fail or become unreliable without affecting communications between the ground stations 710a, 710b and the uncrewed aircraft 730. The system 700 is also extensible allowing for relatively easy expansion to allow for multiple ground stations to manage or control multiple uncrewed aircraft without having to provision significantly more network resources or alter the primary architecture.

Similar to previous examples, the system 700 includes a ground station 710a having at least one display 714, one or more flight management systems 716 and other elements described herein with respect to other ground station examples. As shown in FIG. 7, each ground station may have similar components and a unique item number for each has been omitted. That is, the second ground station 710b includes substantially similar components to the first ground station 710a, as indicated by the corresponding elements. Also, similar to previous examples, each ground station is operably coupled to redundant internet service providers 712a, 173a for ground station 710a and 712b, 713b for ground station 710b. In some cases, the internet service providers are a combination of hard wired and wireless internet service providers, which allows for a level of communication medium diversity.

Also similar to previous examples, the uncrewed aircraft 730 includes a pair of flight management systems 734a, 734b, one or more flight computers 736a, 736b, and one or more display units 738a, 738b. The uncrewed aircraft also includes other various components, a description of which is not repeated for this figure to improve clarity and reduce redundant description. As shown in FIG. 7, the uncrewed aircraft also includes redundant communication modules 732a, 732b. Each of the communication modules 732a, 732b is operably coupled to one or both of the routing elements 720a, 720b. The connections depicted in dotted lines in FIG. 7 may represent fail-over connections in which the communication modules 732a, 732b may be switched between routing elements 720a, 720b in response to a reliability condition indicating one of the routing elements 720a, 720b may be unable to provide reliable communications.

The system 700 of FIG. 7 is able to provide ground to air communications for uploading flight plans, flight instructions, or other commands directed to the uncrewed aircraft 730. The system 700 is also able to provide air to ground communications including telemetry, camera signals, or other data collected by the uncrewed aircraft 730 for access by one of the ground stations 710a, 710b. The system 700 is also able to transmit voice communications between the operator of the ground stations 710a, 710b and entities in communication with the uncrewed aircraft 730, like air traffic control, other aircraft, or other entities.

The system 700 may be able to provide at least single-fault reliability in a number of different scenarios. For example, the system 700 may be able to handle faults on any one of the internet service providers 712a, 713a or 712b, 713b, any one of the communication modules 732a, 732b, any one of the routing elements 720a, 720b, as well as any one of the redundant components or subsystems located within the ground stations 710a, 710b or the uncrewed aircraft 730.

The system 700 may be configured to operate in using a uniform or designated message format that enables versatile use over a range of data types (commands, voice, telemetry) and enables routing for a variety of fault scenarios. In one example implementation, each message includes a header with (a) an aircraft identifier which may use between 16 and 32 bits, (b) a direction flag, which may be accommodated using 1 bit in which [0] designates messages from the aircraft and [1] designates messages from an ground station, and (c) a message type indicating whether the message is to be forwarded or a subscription request, which may be accommodated using 1 to 32 bits.

Telemetry, commanding, and voice messages are all forwarded by the routing elements 720a, 720b. The routing services running on the routing elements 720a, 720b are content-agnostic for these messages and the services do not parse the messages or implement any message-specific handling. This reduces the complexity of the routing services and allows the system 700 to handle a broad range of data types with little or no changes to the architecture. In general, when the routing elements 720a, 720b receive any message (to be forwarded for subscription), the routing elements 720a, 720b verify that the message signature is valid and that the message was signed by a key referenced in the public key database installed on the router. When receiving a message to be forwarded, the routing elements 720a, 720b additionally verify that the signing key is allowed to send messages of this type per the public key database installed on the router, the message is timely (having a timestamp within a threshold of a current time reference), and that the message is strictly ordered with regards to other messages from the same sender or stream identifier. In some cases, the routing elements 720a, 720b are also configured to ensure that the message is not a duplicate. Once the routing elements 720a, 720b have verified a message to be forwarded, the routing elements 720a, 720b add their own signature in addition to the sender's signature. This provides a faster path for revoking sender credentials that does not require updating senders or receivers.

In a typical implementation, the routing elements 720a, 720b are operably coupled to or include a satellite communication network including a satellite subsystem, which enables the transmission of data from a ground-based server or other hardware element to the communication modules 732a, 732b onboard the aircraft 730. The satellite subsystems are configured to receive data from one or more ground-based stations and relay the data to an aircraft while in flight. A more detailed description of the operation of the satellite subsystems is provided above with respect to FIG. 1 and is not repeated with respect to FIG. 7 in order to reduce redundancy.

Figure 8:
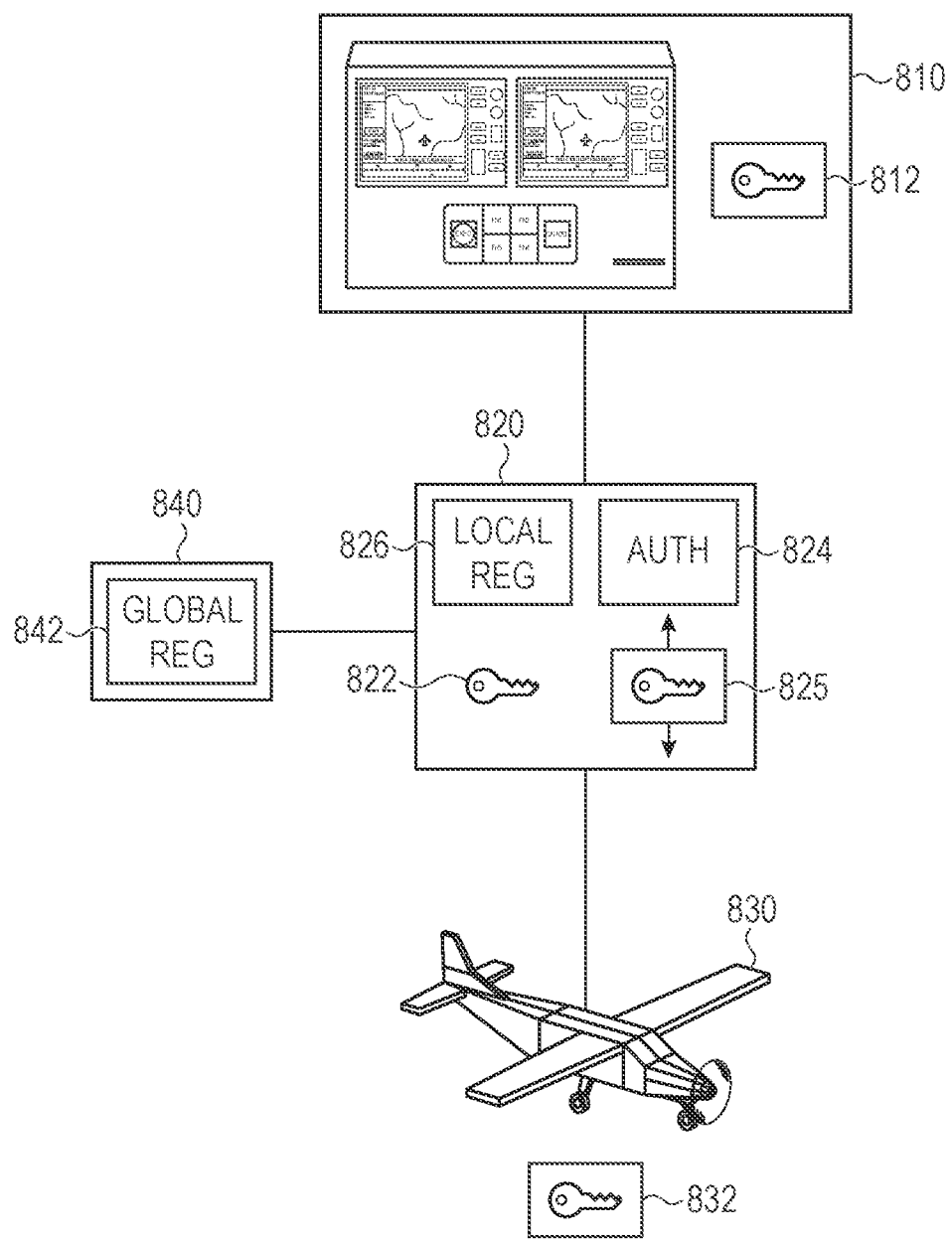
FIG. 8 depicts an example security system for authenticating flight plans and instructions provided by a ground station to an uncrewed aircraft.

FIG. 8 depicts an example system for authenticating flight plans and instructions provided by a ground station to an uncrewed aircraft. Specifically, the system 800 of FIG. 8 corresponds to the other communication systems described herein but has been simplified to focus on components and services that may be used to ensure secure communications between a ground station 810 and an uncrewed aircraft 830. As described previously, security may be managed by the routing element 820 alone or in combination with a cloud-based registry 840.

The system 800 of FIG. 8 may be used to implement a passive cryptographic routing scheme in which the routing element 820 is able to verify signatures and example packets but does not need to modify the contents of packets. This enables a fully stateless protocol, which may be beneficial given the network architecture and the possibility of lost packets, latency, multiple endpoints, and other system characteristics. Alternatively, the systems described herein may include routing elements and a security scheme in which the routing elements are active cryptographic participants in which session-specific encryption keys or schemes are used to encode packets and packet content.

In the system 800, each sender has a private key that is used to encrypt transmitted messages. As shown in FIG. 8, the ground station 810 includes a user private key 812, which may be stored on an electronic device like a smart card that is inserted or otherwise operably coupled to the ground station 810. Similarly, the uncrewed aircraft 830 includes a private key 832, which may be stored in non-transitory or non-volatile memory on the flight computer or other on-board system. Each routing element 820 includes its own key 822, which is used to add a router signature to packets that are processed by the routing element 820. A database of public keys is also stored on each of the ground station 810, routing elements 820, and the uncrewed aircraft 830. The database of public keys may be indexed by sender identifier and key identifier and may allow for multiple public keys to allow for key rotation over time.

In a typical operation, each packet sender (the ground station 810 or the uncrewed aircraft 830) may add a sender signature using the corresponding private key, which may be used to validate messages that are transmitted. In some implementations, the routing element 820 includes a packet authenticating service that verifies the signature of the sender using a local registry 826 or similar data store. A global registry 842 or other similar data store may be stored on a cloud-based registry 840 and used to revoke authority or update local registries of the various system components. The global registry 842 may include a series of entries corresponding to currently authorized users. As described above, authorized users may include licensed pilots who are currently authorized to generate and execute flight plans and routes using the system described above. Each entry in the global registry 842 may include one or more of: a token, registered signature, sender key identifier, or other information that can be used to verify an operator and/or data packets transmitted from a ground station using an encryption key or signature. As described previously, an encryption key may be stored on a removable media that is inserted into or otherwise operably coupled to the ground station. The stored encryption key can be used to encrypt data packets, generate sender key identifiers, and also authenticate commands issued from the ground station. As described previously, removable media including an encryption key must be both operably coupled to the ground station and contain an encryption key having a corresponding registration entry stored in the global registry 842 before the system will execute some commands or user input (including, for example, the execute route input). This ensures that an authorized user is both located at the ground station and has a current and valid registration before certain commands can be executed. This also allows the system to revoke authorization for a particular user through use of the global registry 842.

As data packets 825 are processed by the routing element 820, the authorization service 824 may verify the signature of the sender and perform other checks on the packets including timeliness, duplicate packets, packet order, and packet integrity. Additionally, the routing element 820 may add a routing signature using the routing element key 822. The recipient can use both the routing signature and the sending signature to validate received messages ensuring the integrity of the data communication.

Entries in the public key databases may be identified by type. The type determines which message types and signature types will be accepted when signed by the corresponding private key. Example types include aircraft messaging types, which may include telemetry and voice data packets; ground station types, which may include commands and voice packets; and router types, which applies to all messages processed by the routing element.

In some implementations, a nested or multiple header scheme is used for transmitted data packets. A first or inner header may include (a) a sender identifier, which may be accommodated using 32 bits, (b) a sender key identifier, which may be accommodated using 8 bits and may also identify a specific public/private key pair associated with the sender identifier, (c) a stream identifier, which may be accommodated using 8 bits, and (d) a timestamp, which may be accommodated using 64 bits and referenced using a universal or synchronized time reference. A second or outer header may include, (a) a sender signature, which may be accommodated using 512 bits and may sign the full message body and the first or inner header, (b) a router identifier, which may be accommodated using 32 bits, (c) a router key identifier, which may be accommodated using 8 bits and may include an identifier of a specific public/private key pair associated with the router, and (d) a router signature, which may be accommodated using 32 bits and may sign the full message body and the first or inner header.

The system 800 may also maintain multiple keys for each sender, which may allow for older keys to be phased out and replaced with new keys without interrupting service. The cloud-based registry 840 may also be used to quickly and efficiently revoke access to a user or operator that is no longer authorized by denying access at the router without requiring that all of the pubic databases at every component of the system be updated to reflect the revoked access. The system 800 may also include additional security features that may vary depending on the implementation.

Figure 9:
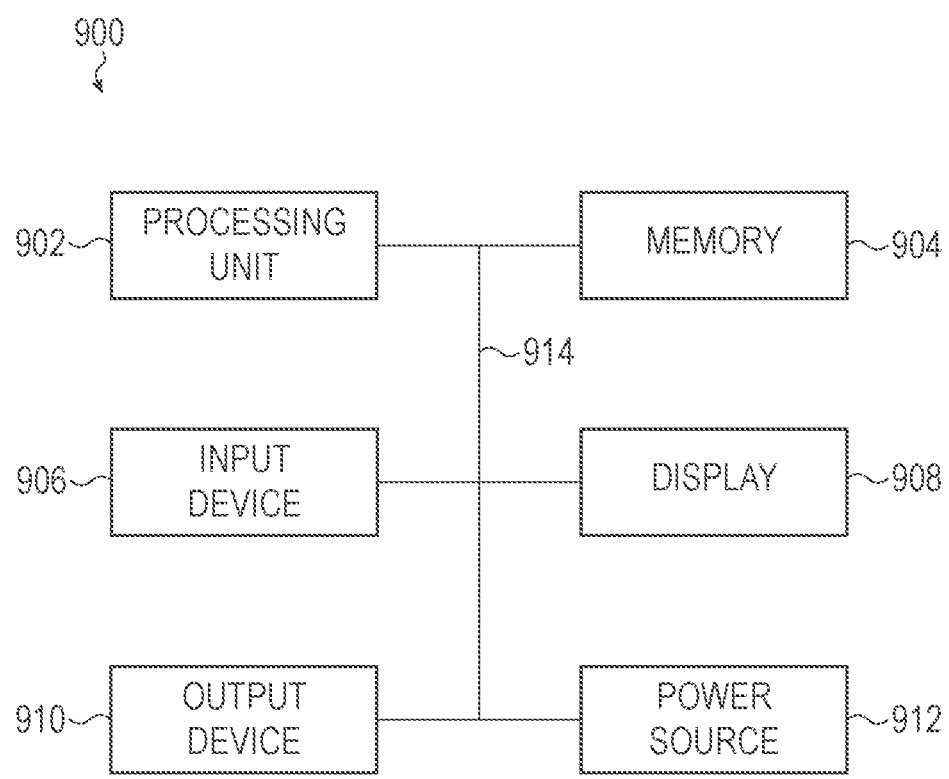
FIG. 9 depicts an example electronic device.

FIG. 9 illustrates a sample electrical block diagram of an electronic device 900 that may perform the operations described herein. The electronic device 900 may in some cases take the form of any of the electronic devices described with reference to FIGS. 1-8, including any computing systems, client devices, servers, or other computing devices associated with the systems 100 and 200 (e.g., the computing system on board the uncrewed aircraft, the terminal device operated by the remote client, and/or other systems and/or devices for implementing the techniques described herein). The electronic device 900 can include one or more of a display 908, a processing unit 902, a power source 912, a memory 904 or storage device, input devices 906, and output devices 910. In some cases, various implementations of the electronic device 900 may lack some or all of these components and/or include additional or alternative components.

The processing unit 902 can control some or all of the operations of the electronic device 900. The processing unit 902 can communicate, either directly or indirectly, with some or all of the components of the electronic device 900. For example, a system bus or other communication mechanism 914 can provide communication between the processing unit 902, the power source 912, the memory 904, the input device(s) 906, and the output device(s) 910.

The processing unit 902 can be implemented as any electronic device capable of processing, receiving, or transmitting data or instructions. For example, the processing unit 902 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 900 can be controlled by multiple processing units. For example, select components of the electronic device 900 (e.g., an input device 906) may be controlled by a first processing unit and other components of the electronic device 900 (e.g., the display 908) may be controlled by a second processing unit, where the first and second processing units may or may not be in communication with each other.

The power source 912 can be implemented with any device capable of providing energy to the electronic device 900. For example, the power source 912 may be one or more batteries or rechargeable batteries. Additionally or alternatively, the power source 912 can be a power connector or power cord that connects the electronic device 900 to another power source, such as a wall outlet or a power system of the aircraft.

The memory 904 can store electronic data that can be used by the electronic device 900. For example, the memory 904 can store electronic data or content such as, for example, audio files, video files, voice communication packets, documents and applications, device settings and user preferences, computer instructions, timing signals, control signals, and data structures or databases. The memory 904 can be configured as any type of memory. By way of example only, the memory 904 can be implemented as random access memory, read-only memory, Flash memory, removable memory, other types of storage elements, or combinations of such devices.

In various embodiments, the display 908 provides a graphical output, for example associated with an operating system, user interface, and/or applications of the electronic device 900. For example, the display 908 may display graphical user interfaces associated with the systems 200 and 300, or any other graphical user interfaces or other graphical outputs described herein. In one embodiment, the display 908 includes one or more sensors and is configured as a touch-sensitive (e.g., single-touch, multi-touch) and/or force-sensitive display to receive inputs from a user. For example, the display 908 may be integrated with a touch sensor (e.g., a capacitive touch sensor) and/or a force sensor to provide a touch- and/or force-sensitive display. The display 908 is operably coupled to the processing unit 902 of the electronic device 900. Additionally or alternatively, the display 908 may include one or more bezel buttons or other input devices that are arranged along the perimeter of the viewable display area.

The display 908 can be implemented with any suitable technology, including, but not limited to, liquid crystal display (LCD) technology, light emitting diode (LED) technology, organic light-emitting display (OLED) technology, organic electroluminescence (OEL) technology, or another type of display technology.

In various embodiments, the input devices 906 may include any suitable components for detecting inputs. As described above with regard to the example system 200 of FIG. 2, the input device 906 may include a keyboard, mouse, trackpad, or other similar type of input device configured to receive typing, cursor control, or other user input. In some cases, a separate tablet or other portable electronic device may include a touch screen or touch sensor that can be adapted for use as an input device 906 for the device 900. Other examples of input devices 906 include, without limitation, light sensors, temperature sensors, audio sensors (e.g., microphones), optical or visual sensors (e.g., cameras, visible light sensors, or invisible light sensors), proximity sensors, touch sensors, force sensors, mechanical devices (e.g., switches, buttons, or keys), airspeed sensors, altimeters, accelerometers, tilt sensors, radar sensors, LiDAR sensors, vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, or electrodes. Each input device 906 may be configured to detect one or more particular types of input and provide a signal (e.g., an input signal) corresponding to the detected input. The signal may be provided, for example, to the processing unit 902.

As discussed above, in some cases, the input device(s) 906 include a touch sensor (e.g., a capacitive touch sensor) integrated with the display 908 to provide a touch-sensitive display. Similarly, in some cases, the input device(s) 906 include a force sensor (e.g., a capacitive force sensor) integrated with the display 908 to provide a force-sensitive display. Additionally or alternatively, the input device(s) 906 may include a separate trackpad, mouse, tablet, or other device configured to receive touch and/or force input from the user.

The output devices 910 may include any suitable components for providing outputs. Examples of output devices 910 include, without limitation, light emitters, audio output devices (e.g., speakers), visual output devices (e.g., lights or displays), tactile output devices (e.g., haptic output devices), and communication devices (e.g., wired or wireless communication devices). Each output device 910 may be configured to receive one or more signals (e.g., an output signal provided by the processing unit 902) and provide an output corresponding to the signal.

In some cases, input devices 906 and output devices 910 are implemented together as a single device. For example, an input/output device or port can transmit electronic signals via a communications network, such as a wireless and/or wired network connection. Examples of wireless and wired network connections include, but are not limited to, the example communication systems described herein and include, without limitation, satellite communication systems, cellular systems, Wi-Fi, Bluetooth, IR, or Ethernet connections.

The processing unit 902 may be operably coupled to the input devices 906 and the output devices 910. The processing unit 902 may be adapted to exchange signals with the input devices 906 and the output devices 910. For example, the processing unit 902 may receive an input signal from an input device 906 that corresponds to an input detected by the input device 906. The processing unit 902 may interpret the received input signal to determine whether to provide and/or change one or more outputs in response to the input signal. The processing unit 902 may then send an output signal to one or more of the output devices 910, to provide and/or change outputs as appropriate.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer-implemented method for operating an uncrewed aircraft using a ground station located remote from the uncrewed aircraft, the method comprising:
   at the ground station located remote from the uncrewed aircraft, generating a first flight plan using a first flight management system;
   at the ground station, generating a second flight plan on a second flight management system, the second flight plan based on the first flight plan;
   generating a route using the first flight plan stored on the first flight management system or the second flight plan stored on the second flight management system, and one or more constraints accessed using one or more geographic locations of the first and second flight plans;
   at the ground station, generating a set of data packets using the generated route;
   extracting a first encryption key obtained from a removable physical media coupled to the ground station;
   encoding each data packet of the set of data packets using the first encryption key to produce a set of encrypted data packets;
   transmitting the set of encrypted data packets to a first router element operably coupled to a first satellite subsystem;
   transmitting the set of encrypted data packets to a second router element operably coupled to a second satellite subsystem, each of the first router element and the second router element configured to verify each of the set of encrypted data packets by evaluating a sender key identifier created using the first encryption key with respect to a registered token stored in a global registry and, in response to a successful verification, relay each respective encrypted data packet to the uncrewed aircraft using a respective one of the first or second satellite subsystems;
   subsequent to the set of encrypted data packets being transmitted to the uncrewed aircraft and prior to execution of flight operations based on the set of encrypted data packets, receiving a user input at the ground station including an execution command; and
   in response to the first encryption key corresponding to a registration entry stored in the global registry, causing the execution of the flight operations based on the set of encrypted data packets on the uncrewed aircraft.

2. The computer-implemented method of claim 1, wherein the flight operations include automated aircraft takeoff operations, automated flight, and automated landing operations executed without intervention by a human operator.

3. The computer-implemented method of claim 1, wherein:
   the route is a first route; and
   subsequent to transmitting the set of encrypted data packets to the uncrewed aircraft, an aircraft computing system onboard the uncrewed aircraft is configured to determine a second route based on the set of encrypted data packets and validate the second route with respect to a terrain database.

4. The computer-implemented method of claim 1, wherein:
   the set of encrypted data packets are transmitted to the first router element via a first internet service provider interface;

the set of encrypted data packets are transmitted to the second router element via a second internet service provider interface distinct from the first internet service provider interface; and in response to detecting a fault in the first internet service provider interface, causing the set of encrypted data packets to be transmitted to the first router element via the second internet service provider interface.

5. The computer-implemented method of claim 4, wherein:
the first internet service provider interface is provided via a wired communication channel; and
the second internet service provider interface is provided via a wireless communication channel.

6. The computer-implemented method of claim 1, wherein in response to the successful verification of the respective encrypted data packet, the first and second router elements are configured to append a router signature to the respective encrypted data packet before causing transmission of the respective data packet to the uncrewed aircraft via the respective one of the first or second satellite subsystems.

7. The computer-implemented method of claim 1, wherein in response to an unsuccessful verification of the respective encrypted data packet, the first and second router elements are configured to block transmission of the respective encrypted data packet.

8. A computer-implemented method for operating an uncrewed aircraft using a ground station remote from the uncrewed aircraft, the method comprising:
at the ground station located remote from the uncrewed aircraft, generating a first flight plan using a first flight management system;
at the ground station, generating a second flight plan on a second flight management system, the second flight plan mirroring the first flight plan;
generating a route using the first flight plan stored on the first flight management system or the second flight plan stored on the second flight management system;
generating a set of data packets using the generated route;
extracting a first encryption key obtained from a removable physical media coupled to the ground station;
encoding each data packet of the set of data packets using the first encryption key to produce a set of encrypted data packets;
transmitting the set of encrypted data packets to a first router element;
transmitting the set of encrypted data packets to a second router element, wherein each of the first router element and the second router element are configured to verify each of the set of encrypted data packets by evaluating a signature created using the first encryption key with an entry stored in a global registry and, in response to a successful verification, relay each respective encrypted data packet to the uncrewed aircraft using a respective satellite subsystem;
subsequent to the set of encrypted data packets being transmitted to the uncrewed aircraft, receiving an execution command at the ground station; and
in response to the first encryption key corresponding to the entry stored in the global registry, causing the execution of flight operations based on the set of encrypted data packets on the uncrewed aircraft.

9. The computer-implemented method of claim 8, wherein:

the set of encrypted data packets are transmitted to the first router element via a first internet service provider interface;
the set of encrypted data packets are transmitted to the second router element via a second internet service provider interface distinct from the first internet service provider interface; and
in response to detecting a fault in the first internet service provider interface, causing the set of encrypted data packets to be transmitted to the first router element via the second internet service provider interface.

10. The computer-implemented method of claim 8, wherein:
the execution command is received in response to a user selection of a control element of the ground station; and
in response to the first encryption key not having a corresponding entry stored in the global registry, the ground station is configured to disregard user selection of the control element.

11. The computer-implemented method of claim 8, wherein:
the ground station is a first ground station;
the set of encrypted data packets is a first set of encrypted data packets;
the first router element is configured to receive a second set of encrypted data packets from a second ground station; and
in response to detection of a fault in the first router element, the first set of encrypted data packets and the second set of encrypted data packets are transmitted to the second router element.

12. The computer-implemented method of claim 8, wherein in response to an unsuccessful verification of the respective encrypted data packet, the first and second router elements are configured to block transmission of the respective encrypted data packet.

13. The computer-implemented method of claim 8, wherein:
the first encryption key is stored in a digital certificate of a public key infrastructure scheme; and
the digital certificate is associated with a licensed pilot authorized to operate the ground station.

14. The computer-implemented method of claim 8, wherein:
the set of encrypted data packets are transmitted to the first router element via a first internet service provider interface;
the set of encrypted data packets are transmitted to the second router element via a second internet service provider interface distinct from the first internet service provider interface;
the first internet service provider interface is provided via a wired communication channel; and
the second internet service provider interface is provided via a wireless communication channel.

15. A ground station for remotely operating an uncrewed aircraft, the ground station comprising:
a first flight management system configured to store a first flight plan;
a second flight management system configured to store a second flight plan that mirrors the first flight plan;
a display; and
a flight planning and display controller operably coupled to the display, the first flight management system, and the second flight management system, the flight planning and display controller including a processing unit and computer readable memory storing instructions that, when executed by the processing unit, cause the flight planning and display controller to:

generate a route using the first flight plan stored on the first flight management system or the second flight plan stored on the second flight management system, and one or more constraints;

generate a set of data packets using the generated route;

extract a first encryption key obtained from a removable physical media coupled to the ground station;

encode each data packet of the set of data packets using the first encryption key to produce a set of encrypted data packets;

transmit the set of encrypted data packets to a first router element;

transmit the set of encrypted data packets to a second router element, wherein each of the first router element and the second router element is configured to verify each of the set of encrypted data packets by evaluating a signature created using the first encryption key with an entry stored in a global registry and, in response to a successful verification, relay each respective encrypted data packet to the uncrewed aircraft using a respective satellite subsystem;

receive an execution command at the ground station; and in response to the first encryption key corresponding to the entry stored in the global registry, cause the execution of flight operations based on the set of encrypted data packets on the uncrewed aircraft.

16. The ground station of claim 15, wherein:

the ground station is operably coupled to a first internet service provider interface via a wired connection and a second internet service provider via a wireless connection;

the set of encrypted data packets are transmitted to the first router element via the first internet service provider; and the set of encrypted data packets are transmitted to the second router element via the second internet service provider.

17. The ground station of claim 15, wherein in response to detecting a fault in operation of the first internet service provider, the set of encrypted data packets are transmitted to the first router element via the second internet service provider.

18. The ground station of claim 15, wherein:

the removable media is a smart card having a memory;

the first encryption key is stored in the memory of the smart card; and the smart card is inserted into a port of the ground station.

19. The ground station of claim 15, wherein:

the first encryption key is stored in a digital certificate of a public key infrastructure scheme; and the digital certificate is issued to a licensed pilot authorized to operate the ground station.

20. The ground station of claim 15, wherein:

the execution command is received in response to a user selection of a control element of the ground station; and in response to the first encryption key not having a corresponding entry stored in the global registry, the ground station is configured to disregard user selection of the control element.

* * * * *